(12) United States Patent
Matsuda et al.

(10) Patent No.: US 12,292,218 B2
(45) Date of Patent: May 6, 2025

(54) RESERVOIR TANK, COOLING DEVICE, AND PROJECTOR

(71) Applicant: Panasonic Intellectual Property Management Co., Ltd., Osaka (JP)

(72) Inventors: Toshihiko Matsuda, Osaka (JP); Shigeyoshi Matsui, Osaka (JP); Shigekazu Yamagishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 184 days.

(21) Appl. No.: 17/388,451

(22) Filed: Jul. 29, 2021

(65) Prior Publication Data

US 2022/0034563 A1 Feb. 3, 2022

(30) Foreign Application Priority Data

Jul. 29, 2020 (JP) .................................. 2020-128434
Jul. 28, 2021 (JP) .................................. 2021-122937

(51) Int. Cl.
*F25B 43/00* (2006.01)
*G03B 21/16* (2006.01)

(52) U.S. Cl.
CPC ............ *F25B 43/006* (2013.01); *G03B 21/16* (2013.01)

(58) Field of Classification Search
CPC .... F25B 43/006; F25B 2400/16; F25B 43/00; G03B 21/16
See application file for complete search history.

(56) References Cited

U.S. PATENT DOCUMENTS

2004/0001312 A1 1/2004 Hotta et al.

FOREIGN PATENT DOCUMENTS

| CN | 105091429 A | * | 11/2015 | ............ F25B 43/006 |
|----|-------------|---|---------|-------------------------|
| EP | 2631566 A1 | * | 8/2013 | ............ F25B 40/02 |
| JP | 58-031004 | | 3/1983 | |
| JP | 2002090007 A | * | 3/2002 | |
| JP | 2004-84958 | | 3/2004 | |
| JP | 2005-286119 | | 10/2005 | |
| JP | 3885679 | | 2/2007 | |
| JP | 2013026527 A | * | 2/2013 | ............... G06F 1/20 |
| JP | 2013-45942 | | 3/2013 | |

* cited by examiner

*Primary Examiner* — Kun Kai Ma
(74) *Attorney, Agent, or Firm* — Wenderoth, Lind & Ponack, L.L.P.

(57) ABSTRACT

A reservoir tank includes: a tank main body configured to store a refrigerant within the tank main body; an inflow path configured to allow the refrigerant to flow into the tank main body; an outflow path configured to allow the refrigerant to flow out of the tank main body; a collision member that has a first surface and faces an outlet of the inflow path within the tank main body, wherein the collision member is configured such that the refrigerant flowing out from the outlet of the inflow path collides against the first surface; and an air bubble mixing prevention member that faces an inlet of the outflow path within the tank main body, wherein the air bubble mixing prevention member is configured to prevent air bubbles from getting into the outflow path.

10 Claims, 35 Drawing Sheets

RESERVOIR TANK, COOLING DEVICE, AND PROJECTOR

BACKGROUND

1. Technical Field

The present disclosure relates to a reservoir tank, a cooling device, and a projector.

2. Description of the Related Art

It is known that, in a cooling device that cools a heating element by circulation of a refrigerant, a reservoir tank for trapping air mixed in the refrigerant is used.

Unexamined Japanese Patent Publication No. 2004-84958 describes a liquid-cooled tank that separates the air mixed in the refrigerant and traps the separated air and, thus, prevents the air from getting into a pump that is a power source for circulating the refrigerant.

SUMMARY

The liquid-cooled tank described in Unexamined Japanese Patent Publication No. 2004-84958 has a problem that the air is re-mixed when a flow of the refrigerant is increased.

The present disclosure provides a reservoir tank having improved gas-liquid separation performance, and a cooling device and a projector including the reservoir tank.

A reservoir tank according to one aspect of the present disclosure includes: a tank main body configured to store a refrigerant within the tank main body; an inflow path configured to allow the refrigerant to flow into the tank main body; an outflow path configured to allow the refrigerant to flow out of the tank main body; a collision member that has a first surface and faces an outlet of the inflow path within the tank main body, wherein the collision member is configured such that the refrigerant flowing out from the outlet of the inflow path collides against the first surface of the collision member; and an air bubble mixing prevention member that faces an inlet of the outflow path within the tank main body, wherein the air bubble mixing prevention member is configured to prevent air bubbles from getting into the outflow path.

A cooling device according to one aspect of the present disclosure includes: the reservoir tank described above; a pump configured to circulate the refrigerant; a heat receiving unit configured to receive heat from a heating element; and a heat exchanger configured to cool the refrigerant. The cooling device cools the heating element by circulation of the refrigerant stored in the reservoir tank.

A projector according to one aspect of the present disclosure includes the cooling device described above.

According to the present disclosure, it is possible to provide a reservoir tank having improved gas-liquid separation performance, and a cooling device and a projector including the reservoir tank.

DETAILED DESCRIPTION

Background to the Present Disclosure

Figure 1:
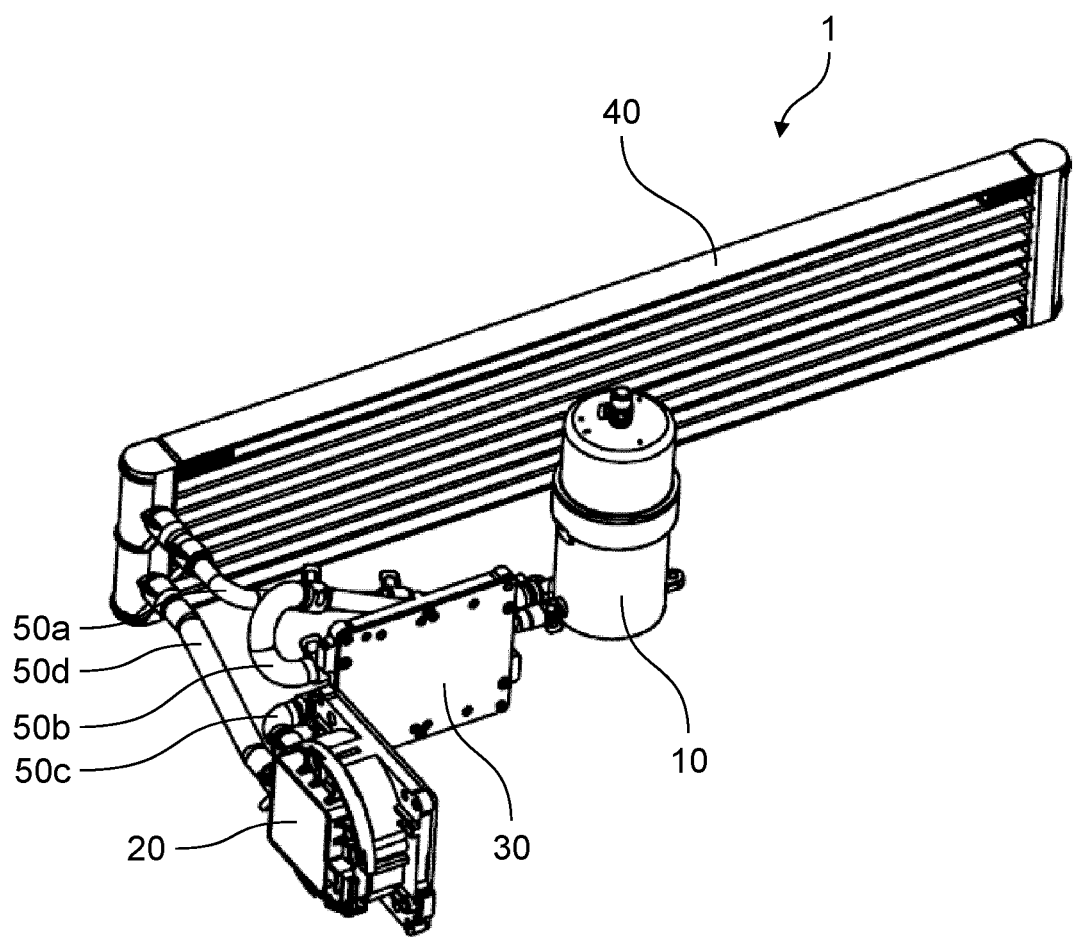
FIG. 1 is a perspective view illustrating a cooling device according to a first exemplary embodiment.

A projection-type image display apparatus (projector) or the like uses a cooling device in order to cool a heat generating component such as a laser light source.

Known cooling methods for a cooling device include a method of cooling a light source directly with a fan, a method of bringing a heat sink having a heat dissipation fin into contact with a heating element and cooling the heat sink with the fan, and the like. Further, there is known a method of configuring a heat sink module in which a heat receiving body and a heat dissipating body are thermally connected using a heat pipe, and cooling the heat dissipating body with a fan.

Moreover, there is a cooling device that circulates a liquid refrigerant to perform cooling. In the cooling device that circulates a refrigerant, a refrigerant having high thermal conductivity is forcibly circulated by a pump, and heat from a heat receiving unit is dissipated by a heat dissipating unit. In some cooling devices, the heat dissipating unit is cooled with a fan to improve cooling performance. Further, a cooling device using such a refrigerant is often provided with a reservoir tank in order to prevent air from getting into a pump when the refrigerant is circulated.

In recent years, a light source in a projector has been rapidly shifting from a lamp light source to a laser light source having higher heat generation density. Moreover, a projector is also required to have higher luminance, and to support omnidirectional (360°) installation. As a result, a cooling device is required to provide high cooling performance and to support omnidirectional installation. On the other hand, a projector is also required to have reduced weight and reduced size.

Therefore, a cooling device and a reservoir tank are required to be smaller in size while a circulation flow rate of the refrigerant is increased in order to improve cooling performance.

When the circulation flow rate of the refrigerant increases, a flow rate of the refrigerant flowing into the reservoir tank also increases. When the flow rate of the refrigerant flowing into the reservoir tank increases, a flow velocity of the refrigerant flowing into the reservoir tank also increases. At this time, an interface between the refrigerant and air in the reservoir tank shakes greatly due to the flowing refrigerant, and this makes air trapped in the reservoir tank easily get into a circulation path of the cooling device again. Therefore, when the flow rate of the refrigerant increases, gas-liquid separation performance of the reservoir tank deteriorates. In order to avoid such deterioration in gas-liquid separation performance, it is necessary to increase the size of the reservoir tank and, therefore, it is difficult to fulfill both gas-liquid separation performance and size reduction requirements.

Therefore, the present inventors have studied a reservoir tank having improved gas-liquid separation performance, and a cooling device and a projector including the same, and have reached the following invention.

A reservoir tank according to one aspect of the present disclosure includes: a tank main body configured to store a refrigerant within the tank main body; an inflow path configured to allow the refrigerant to flow into the tank main body; an outflow path configured to allow the refrigerant to flow out of the tank main body; a collision member that is disposed to face an outlet of the inflow path within the tank main body, and has a first surface against which the refrigerant flowing out from the outlet of the inflow path collides; and an air bubble mixing prevention member that is disposed to face an inlet of the outflow path within the tank main body, and that is configured to prevent air bubbles from getting into the outflow path.

With such a configuration, it is possible to provide a reservoir tank with improved gas-liquid separation performance.

The inlet of the outflow path may be disposed within the tank main body at a position away from an inner wall of the tank main body.

According to this configuration, it is possible to maintain the gas-liquid separation performance even when the tank main body is disposed in a different direction.

The inflow path may include a first inflow path into which the refrigerant flows from outside the tank main body and a second inflow path connected from the first inflow path to the outlet of the inflow path. The second inflow path may have a cross-sectional area larger than a cross-sectional area of the first inflow path.

According to this configuration, the refrigerant is allowed to flow into the tank main body from outside the tank main body while the flow velocity is reduced. As a result, it is possible to reduce shaking of an interface between the refrigerant and air within the tank and, thus, to prevent air from being mixed again into the refrigerant flowing out from the reservoir tank.

The outlet of the inflow path and the inlet of the outflow path are disposed in a first direction, the outlet of the inflow path is provided at a position different from a position of the inlet of the outflow path in the first direction, and the collision member is disposed between the outlet of the inflow path and the inlet of the outflow path in the first direction.

With such a configuration, the reservoir tank may be used regardless of a direction in which the reservoir tank is disposed.

The first surface may have one or more through holes through which the refrigerant moves to a side opposite to the first surface.

Such a configuration allows a part of the refrigerant flowing from the inflow path to flow along the collision member, and the other part of the refrigerant to pass through the through holes and flows. Thus, the refrigerant flowing into the tank main body may be dispersed. Therefore, it is possible to reduce the flow velocity of the refrigerant within the tank main body as a whole, and to prevent air from being mixed again into the refrigerant.

The tank main body may include a first region and a second region within the tank main body, the first region being a region in which the outlet of the inflow path is disposed, the second region being a region in which the inlet of the outflow path is disposed, the first region and the second region may be partitioned with the collision member, and the first region and the second region may communicate with each other through the one or more through holes.

With such a configuration, the outlet of the inflow path and the inlet of the outflow path are disposed in different regions partitioned by the collision member. Thus, the refrigerant flowing into the tank main body from the outlet of the inflow path may be prevented from directly flowing out from the outflow path. Therefore, it is possible to prevent air from being mixed into the refrigerant flowing out from the tank main body.

The one or more through holes may have a sum of opening areas of the one or more through holes that is larger than an opening area of the outlet of the inflow path.

With such a configuration, it is possible to reduce the flow velocity of the refrigerant within the tank main body.

The collision member and the air bubble mixing prevention member may be provided integrally.

With such a configuration, it is possible to reduce the flow velocity of the refrigerant that flows in while the structure of the tank main body is simplified.

The first surface of the collision member may be provided in a planar shape.

With such a configuration, it is possible to cause the refrigerant to collide with the collision member and, thus, to reduce the flow velocity of the inflowing refrigerant.

The first surface of the collision member may be provided in a concave shape.

With such a configuration, it is possible to easily change the path of the refrigerant that flows in. In addition, it is possible to reduce a pressure loss when the refrigerant that flows in collides against the collision member.

The first surface of the collision member may be provided in a convex shape.

With such a configuration, it is possible to easily change the path of the refrigerant that flows in. In addition, it is possible to reduce a pressure loss when the refrigerant that flows in collides against the collision member.

The collision member may have a side wall surrounding the first surface of the collision member, and the side wall may cover at least a part of the outlet of the inflow path.

With such a configuration, it is possible to reverse a course of the refrigerant that flows in. Therefore, it is possible to suppress shaking of the interface between the refrigerant and the air due to inflow of the refrigerant within the tank main body and, thus, to reduce air contained in the refrigerant that flows out. As a result, it is possible to improve gas-liquid separation performance.

A cooling device according to one aspect of the present disclosure includes: the reservoir tank described above; a pump configured to circulate the refrigerant; a heat receiving unit configured to receive heat from a heating element; and a heat exchanger configured to cool the refrigerant, wherein the heating element is cooled by circulation of the refrigerant stored in the reservoir tank.

With such a configuration, it is possible to improve cooling performance while the size of the cooling device is reduced.

A projector according to one aspect of the present disclosure includes the cooling device described above.

With such a configuration, it is possible to provide a projector with reduced size and improved cooling performance.

Hereinafter, exemplary embodiments will be described in detail with appropriate reference to the drawings. It is noted that a more detailed description than needed may be omitted. For example, the detailed description of already well-known matters and overlapping description of substantially the same configurations may be omitted.

This is to avoid an unnecessarily redundancy in the description below and to facilitate understanding of a person skilled in the art. Note that the attached drawings and the following description are provided for those skilled in the art to fully understand the present invention, and are not intended to limit the subject matter as described in the appended claims.

First Exemplary Embodiment

Configuration of Cooling Device

Figure 2:
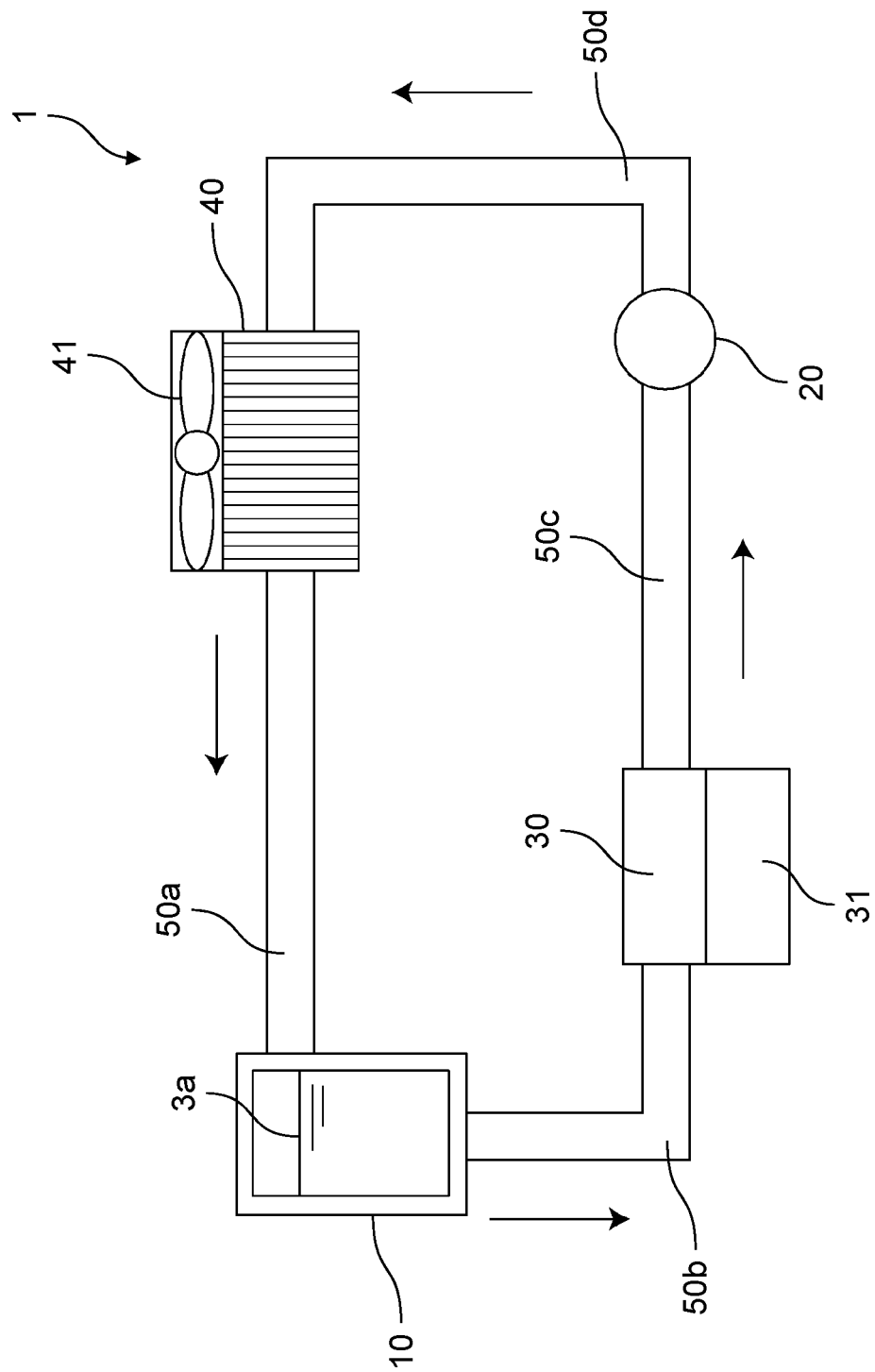
FIG. 2 is a schematic view of the cooling device of FIG. 1.

FIG. 1 is a perspective view illustrating cooling device 1 according to a first exemplary embodiment. FIG. 2 is a schematic view of cooling device 1 of FIG. 1.

As illustrated in FIGS. 1 and 2, cooling device 1 includes reservoir tank 10, pump 20, heat receiving unit 30, and heat exchanger 40. Reservoir tank 10 is a tank that stores a refrigerant and removes air contained in the refrigerant. The pump 20 is a power source that causes the refrigerant to circulate. Heat receiving unit 30 is thermally connected to heating element 31 and takes heat generated from heating element 31. Heat exchanger 40 cools the refrigerant by air cooling fan 41.

Heat receiving unit 30 of cooling device 1 is thermally connected to heating element 31, for example, such as a laser light source of a projector.

In cooling device 1, the refrigerant cools heating element 31 with the refrigerant circulating through refrigerant transport paths 50a to 50d using pump 20 as a power source.

Specifically, heat generated from heating element 31 is received by heat receiving unit 30. Since the refrigerant flows through heat receiving unit 30, the heat received by heat receiving unit 30 is then received by the refrigerant. The refrigerant that has received the heat moves from refrigerant transport path 50c, passes pump 20 and refrigerant transport path 50d, and reaches heat exchanger 40. Here, the refrigerant is cooled by air blown by air cooling fan 41. The refrigerant that has cooled passes through refrigerant transport path 50a, and is introduced into reservoir tank 10 from inflow path 13 (see FIGS. 3 and 4) of reservoir tank 10. After gas-liquid separation of the refrigerant in reservoir tank 10 is performed, the refrigerant that has passed through outflow path 14 (see FIGS. 3 and 4) and flowed out of reservoir tank 10 flows through refrigerant transport path 50b and returns to heat receiving unit 30.

As the refrigerant, an antifreeze solution, such as an ethylene glycol aqueous solution or a propylene glycol aqueous solution, can be used. In addition, an anticorrosive additive for preventing corrosion of a material, such as copper or a copper alloy, used as a material constituting heat receiving unit 30 may be added to the refrigerant.

Refrigerant transport path 50a to 50d are configured by combining a flexible tube and a metal tube. The flexible tube is formed of a high-polymer material having low gas permeability, for example, butyl rubber or fluorine-containing rubber. Further, the metal pipe is formed of copper, aluminum, stainless steel, or the like.

Configuration of Reservoir Tank

Figure 3:
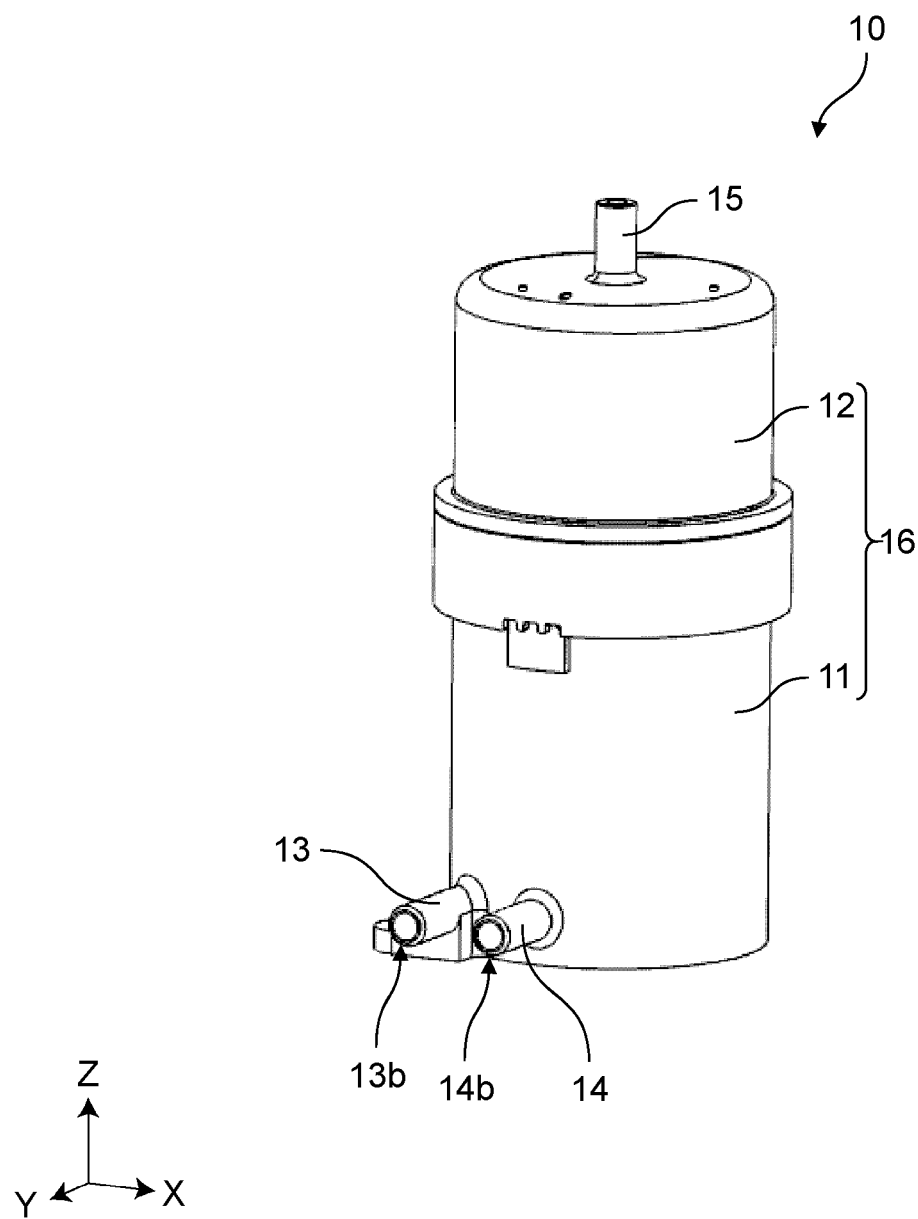
FIG. 3 is a perspective view of a reservoir tank included in the cooling device of FIG. 1.
Figure 4:
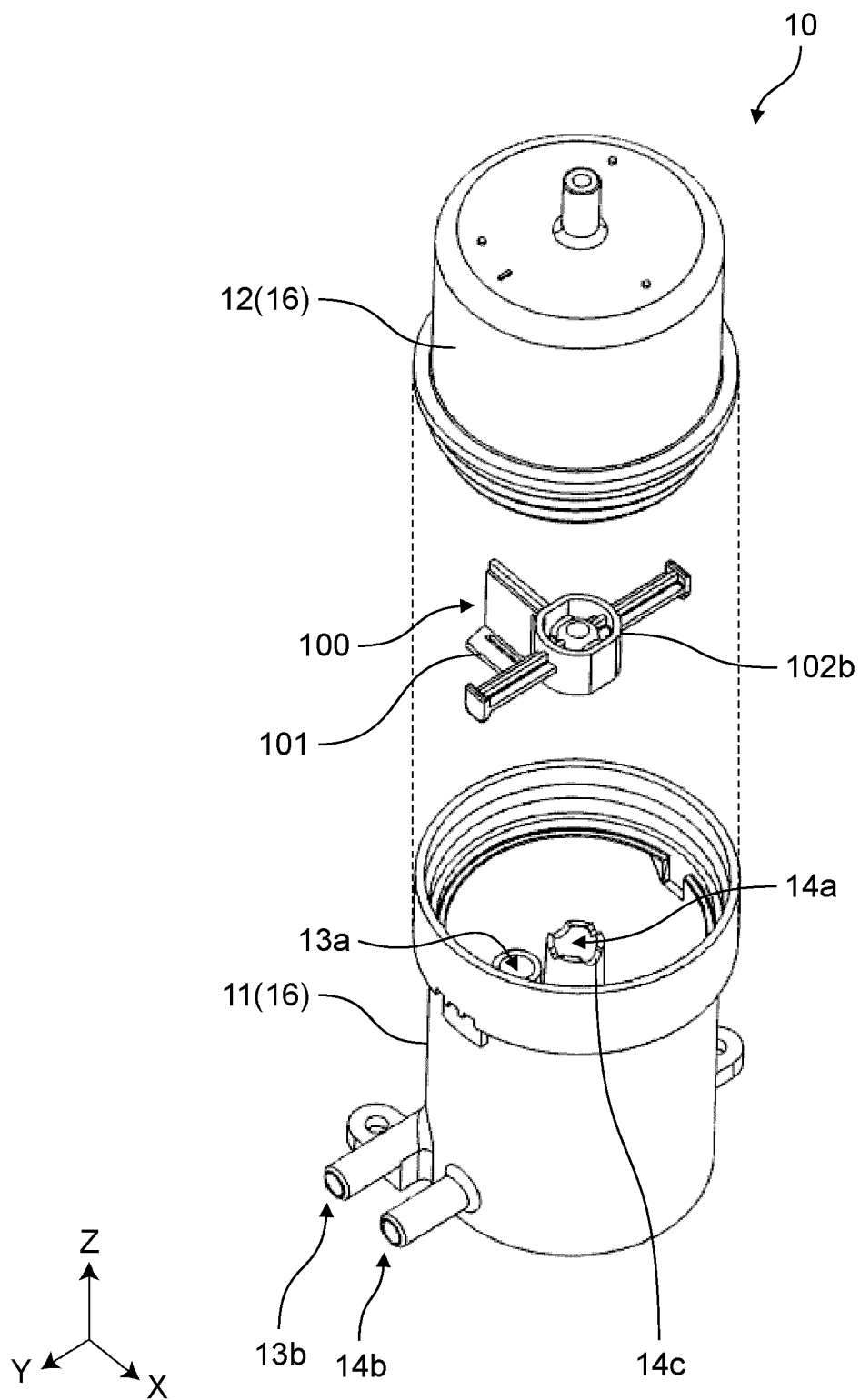
FIG. 4 is an exploded perspective view of the reservoir tank of FIG. 3.
Figure 5A:
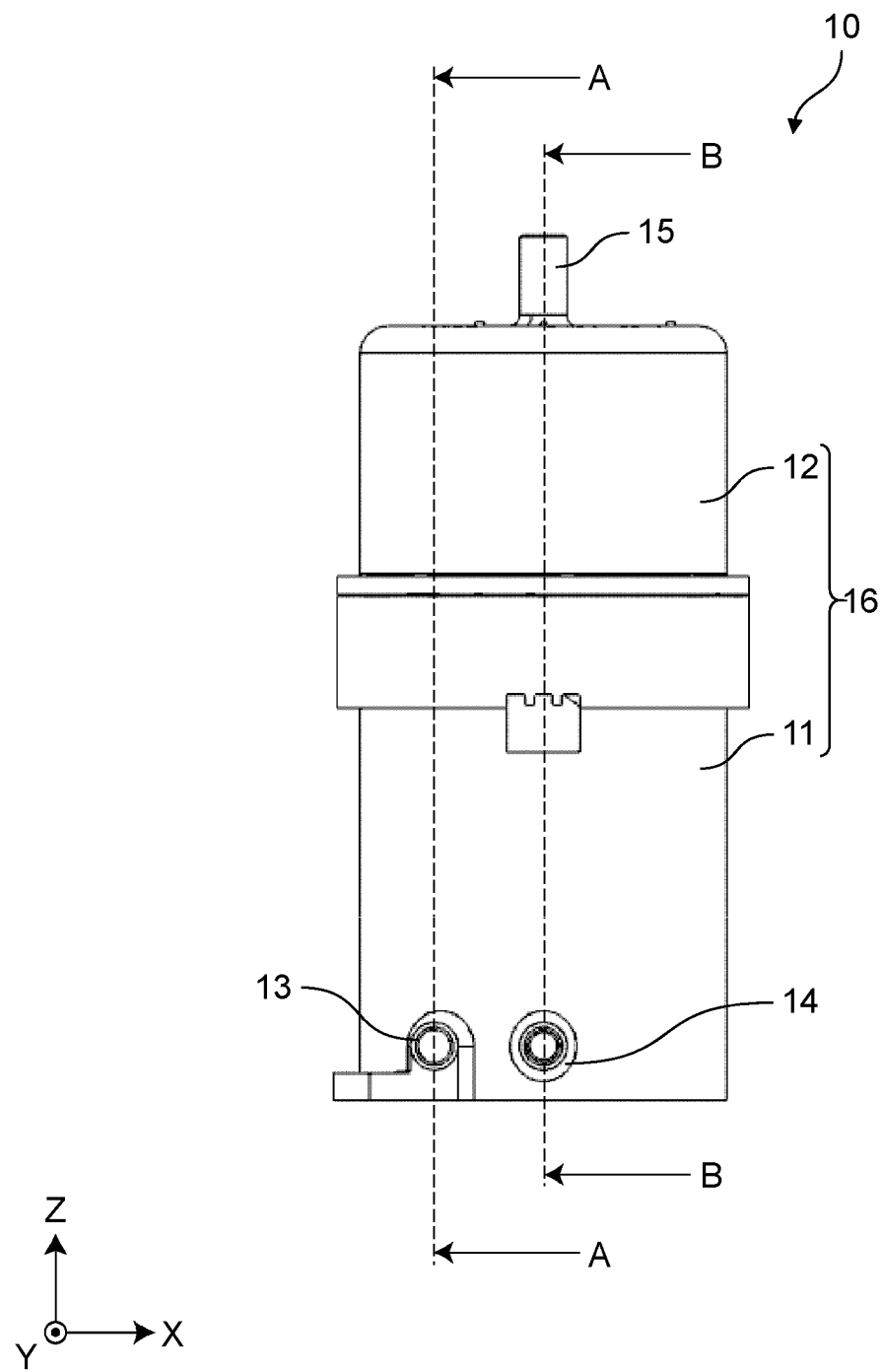
FIG. 5A is a plan view of the reservoir tank of FIG. 3.
Figure 5B:
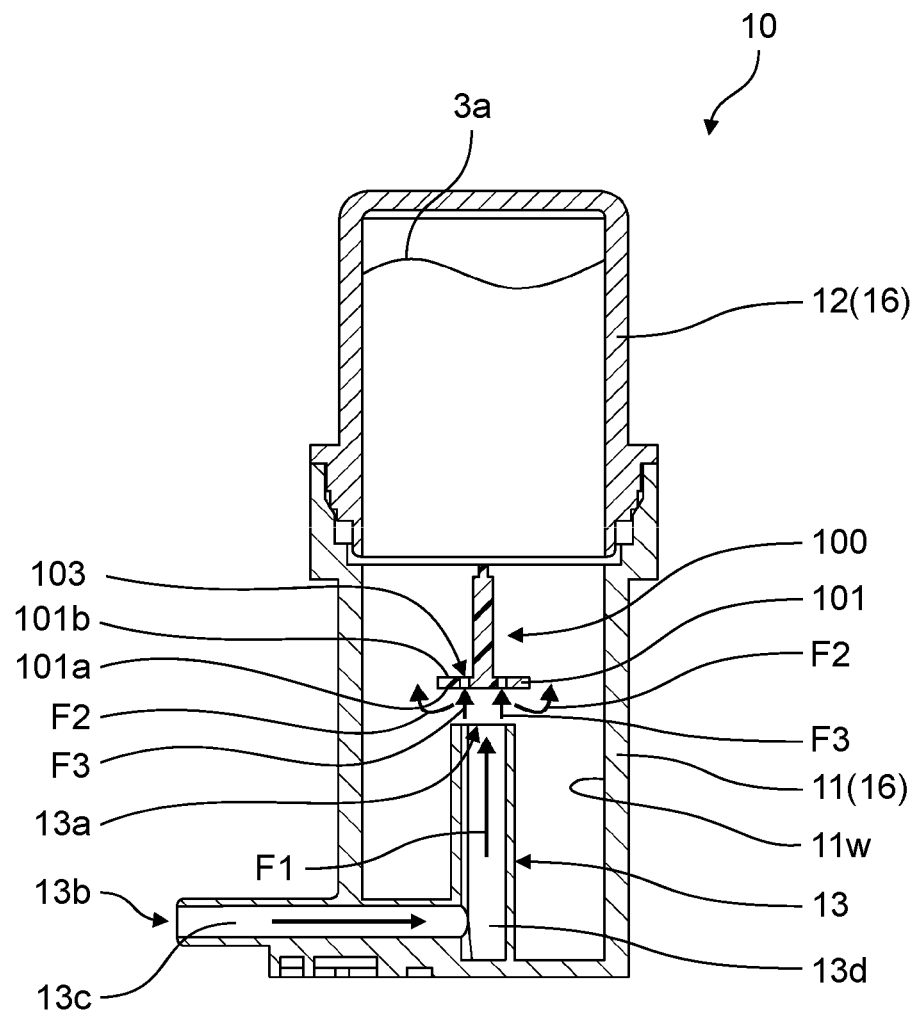
FIG. 5B is a cross-sectional view taken along line A-A in FIG. 5A.
Figure 5C:
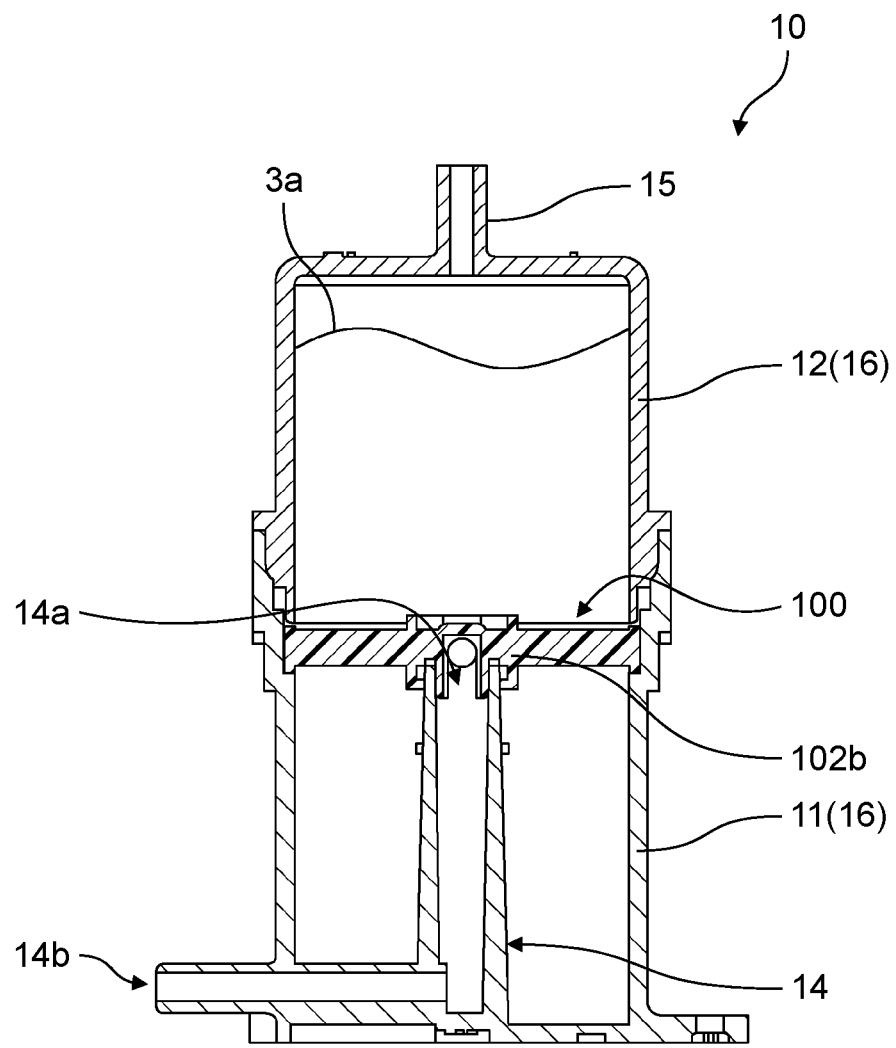
FIG. 5C is a cross-sectional view taken along line B-B in FIG. 5A.
Figure 6A:
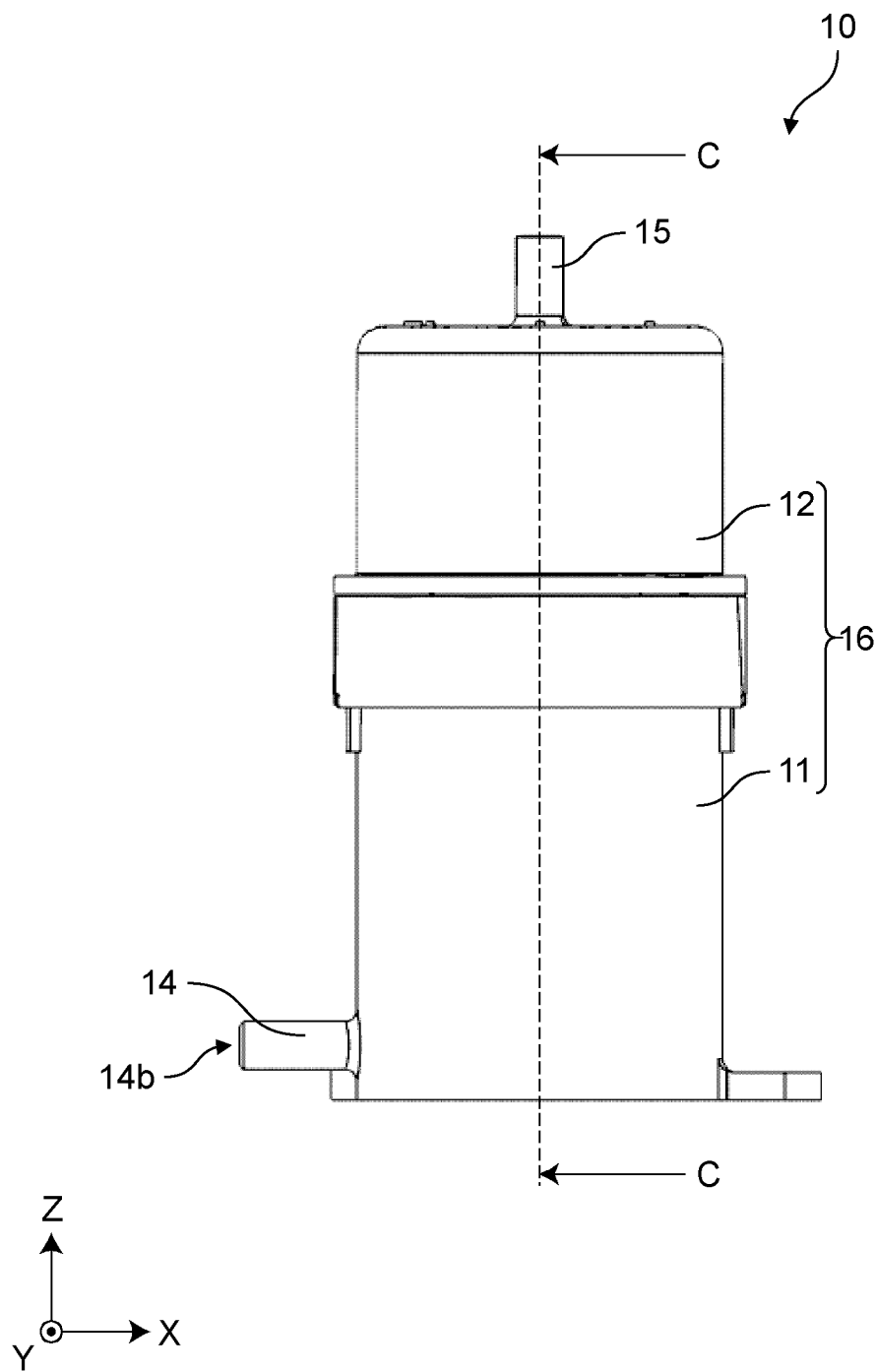
FIG. 6A is a plan view of the reservoir tank of FIG. 3 viewed from another direction.
Figure 6B:
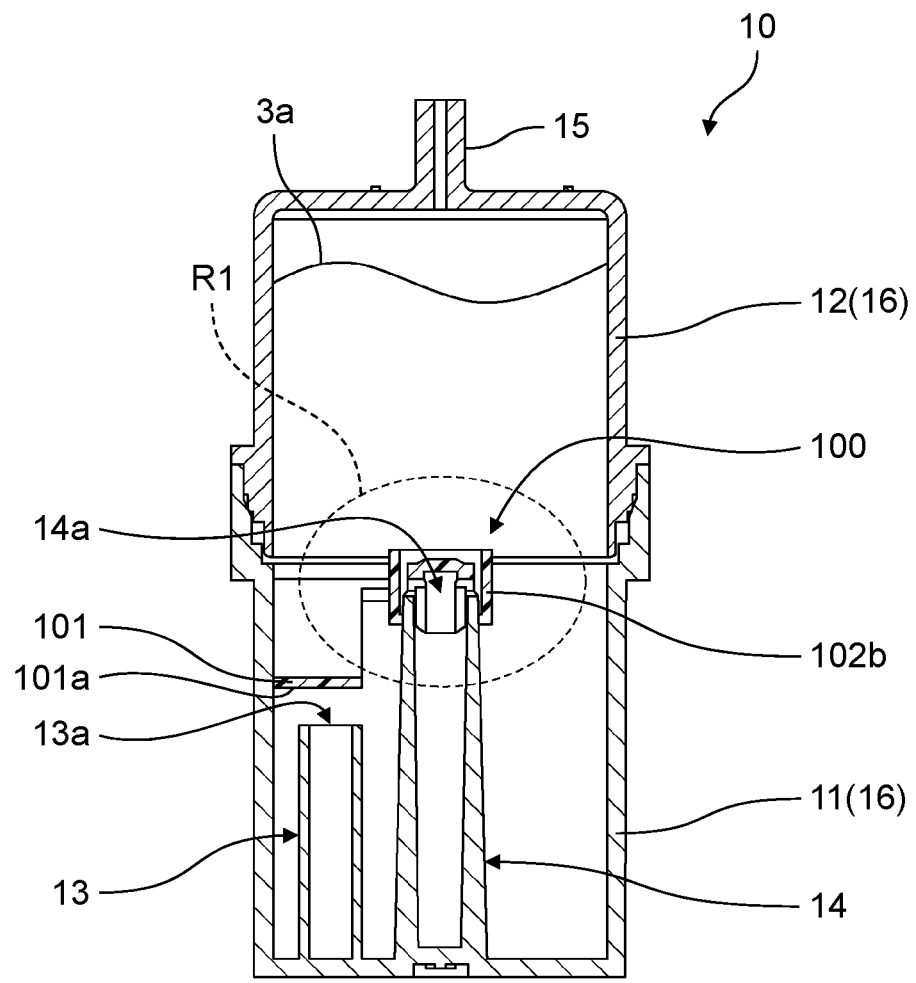
FIG. 6B is a cross-sectional view taken along line C-C in FIG. 6A.
Figure 6C:
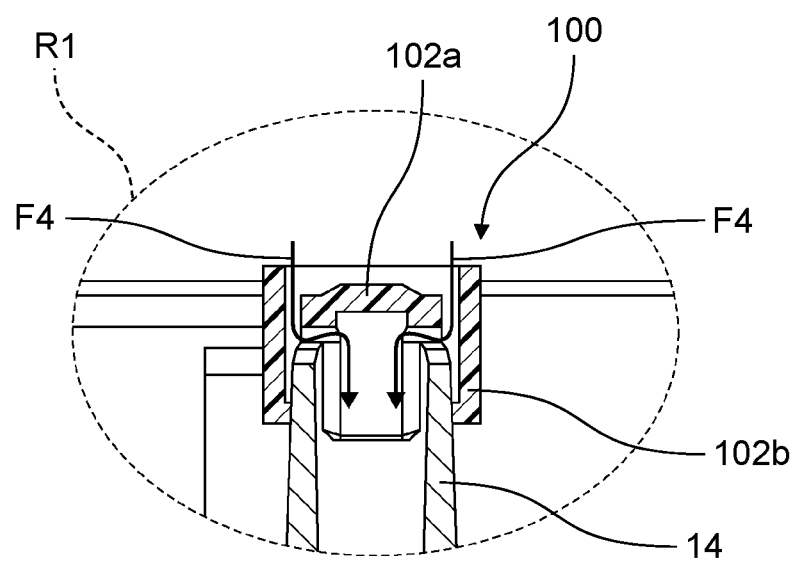
FIG. 6C is an enlarged view of a region R1 indicated by a broken line in FIG. 6B.
Figure 7:
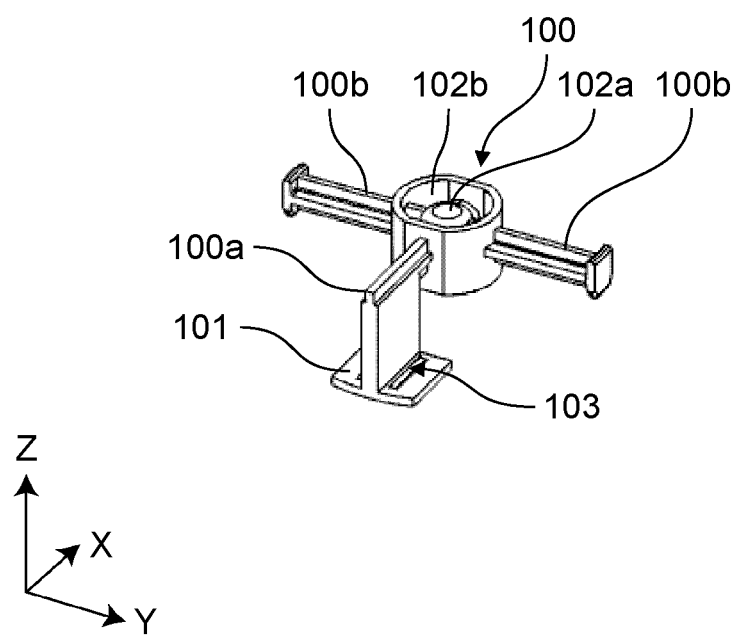
FIG. 7 is a perspective view illustrating a collision member and an air bubble mixing prevention member included in the reservoir tank of FIG. 3.

FIG. 3 is a perspective view of reservoir tank 10 included in cooling device 1 of FIG. 1. FIG. 4 is an exploded perspective view of reservoir tank 10 of FIG. 3. FIG. 5A is a plan view of reservoir tank 10 of FIG. 3. FIG. 5B is a cross-sectional view of reservoir tank 10 of FIG. 5A taken along line A-A. FIG. 5C is a cross-sectional view of reservoir tank 10 of FIG. 5A taken along line B-B. FIG. 6A is a plan view of reservoir tank 10 of FIG. 3 viewed from another direction. FIG. 6B is a cross-sectional view taken along line C-C in FIG. 6A. FIG. 6C is an enlarged view of a region R1 indicated by a broken line in FIG. 6B. FIG. 7 is a perspective view illustrating collision member 101 and air bubble mixing prevention member 100 included in reservoir tank 10 of FIG. 3.

As illustrated in FIGS. 3 and 4, reservoir tank 10 includes tank main body 16, inflow path 13, outflow path 14, collision member 101, and air bubble mixing prevention member 100.

Tank main body 16 stores the refrigerant within tank main body 16. Tank main body 16 includes a tank lower portion 11 and a tank upper portion 12. The tank lower portion 11 and the tank upper portion 12 are bottomed cylindrical containers. Opening portions of the tank lower portion and the tank upper portion are jointed to each other and, thus, form tank main body 16 having a substantially columnar internal space. The tank lower portion 11 is provided with inflow path 13 for allowing the refrigerant to flow into tank main body 16 and outflow path 14 for allowing the refrigerant to flow out of tank main body 16.

The tank upper portion 12 is provided with refrigerant replenishing pipe 15. When the refrigerant within tank main body 16 decreases, the refrigerant can be replenished from refrigerant replenishing pipe 15. To refrigerant replenishing pipe 15, a rubber cap (not shown) is normally attached. When the refrigerant is to be replenished, the rubber cap is first removed, and a container containing the refrigerant, for example, a syringe or the like is connected to refrigerant replenishing pipe 15. Thereby, the refrigerant can be replenished. Alternatively, the refrigerant can be replenished by connecting a hose or the like to refrigerant replenishing pipe 15.

The tank lower portion 11 and the tank upper portion 12 may be made of resin such as polyphenylene sulfide (PPS) or polyphenylene ether (PPE). Alternatively, the tank lower portion 11 and the tank upper portion 12 may be formed of a metal or the like.

The refrigerant passes through inflow path 13 from an inlet 13b of inflow path 13 provided for the tank lower portion 11, and flows into tank main body 16 from outlet 13a of inflow path 13. On the other hand, the refrigerant passes through outflow path 14 from an inlet 14a of outflow path 14 provided for the tank lower portion 11, and flows out from tank main body 16 from an outlet 14b of outflow path 14.

As shown in FIG. 5B, outlet 13a of inflow path 13 is disposed within tank main body 16 at a position away from inner wall 11w of tank main body 16.

The refrigerant having passed through inflow path 13 as indicated by an arrow F1 flows into tank main body 16 from outlet 13a. A part of the refrigerant flowing out from outlet 13a collides against collision member 101 to be described later, changes a traveling direction of the refrigerant as indicated by an arrow F2, and flows in. Further, as indicated by an arrow F3, another part of the refrigerant flowing out from outlet 13a passes through a through hole 103 provided in collision member 101 and flows in without changing the traveling direction.

Inflow path 13 includes first inflow path 13c into which the refrigerant flows from outside tank main body 16, and second inflow path 13d connected to outlet 13a of inflow path 13 from first inflow path 13c. First inflow path 13c is a flow path that penetrates a cylindrical side wall of the tank lower portion 11 from outside to inside of tank main body 16. Further, second inflow path 13d extends from a bottom of the tank lower portion 11 toward the tank upper portion 12. Second inflow path 13d has a cross-sectional area that is larger than a cross-sectional area of first inflow path 13c. Providing inflow path 13 in this manner reduces the flow velocity of the refrigerant when the refrigerant passes through second inflow path 13d having a large cross-sectional area. As shown in FIG. 5B, inflow path 13 is configured such that a direction in which the refrigerant flows through first inflow path 13c is orthogonal to a direction in which the refrigerant flows through second inflow path 13d.

As shown in FIG. 5C, inlet 14a of outflow path 14 is disposed within tank main body 16 at a position away from inner wall 11w of tank main body 16. In the present exemplary embodiment, inlet 14a of outflow path 14 is disposed near a center within tank main body 16.

Air bubble mixing prevention member 100 to be described later is disposed at inlet 14a of outflow path 14, and the refrigerant within tank main body 16 collides against air bubble mixing prevention wall 102b of air bubble mixing prevention member 100 and flows into outflow path 14. Air bubble mixing prevention wall 102b is provided in order to prevent air bubbles (air) from entering the refrigerant discharged from tank main body 16. As shown in FIGS. 5A and 5B, the refrigerant that has entered outflow path 14 is discharged from the outlet 14b of outflow path 14 to outside tank main body 16.

As illustrated in FIG. 6B, outlet 13a of inflow path 13 and inlet 14a of outflow path 14 are disposed facing toward a Z direction. Here, the Z direction corresponds to the "first direction" of the present disclosure. Specifically, inflow path 13 and outflow path 14 are disposed such that openings of the both paths are directed toward the Z direction. In the Z direction, outlet 13a of inflow path 13 and inlet 14a of outflow path 14 are provided at different positions. Specifically, outlet 13a of inflow path 13 and inlet 14a of outflow path 14 are provided at positions having different heights in the Z direction.

Referring back to FIG. 4, air bubble mixing prevention member 100 is disposed within tank main body 16. In the present exemplary embodiment, collision member 101 is provided integrally with air bubble mixing prevention member 100 (see FIG. 7).

As shown in FIG. 5B, collision member 101 is disposed within tank main body 16 so as to face outlet 13a of inflow path 13. Collision member 101 has first surface 101a against which the refrigerant flowing out from inflow path 13 collides. Further, collision member 101 has second surface 101b on a side opposite to first surface 101a. In the present exemplary embodiment, first surface 101a is provided in a planar shape. First surface 101a is provided as a plane along an XY plane. Therefore, a part of the refrigerant flowing out from outlet 13a of inflow path 13 indicated by the arrow F1 collides against first surface 101a of collision member 101, reduces the flow velocity, changes the traveling direction as indicated by the arrow F2, and then flows into tank main body 16.

Collision member 101 is provided with the through hole 103 that moves the refrigerant from first surface 101a toward second surface 101b (surface opposite to first surface 101a). The through hole 103 is defined to be smaller than an opening of outlet 13a of inflow path 13. More preferably, the through hole 103 is sufficiently smaller than outlet 13a of inflow path 13. Further, in the present exemplary embodiment, two through holes 103 are provided for collision member 101. The number of through holes 103 is not limited to two, and may be one or more.

Since the through hole 103 is defined in collision member 101, a part of the refrigerant flowing out from outlet 13a of inflow path 13 passes through the through hole 103 from first surface 101a of collision member 101 to a side opposite to first surface 101a as indicated by an arrow F3.

As described above, by providing the through hole 103 for collision member 101, the refrigerant flowing out from outlet 13a of inflow path 13 is dispersed in the directions of the arrow F2 and the arrow F3, so that the flow velocity of the refrigerant may be reduced as a whole, and the flow deviation may be suppressed.

As illustrated in FIG. 6B, collision member 101 is disposed between outlet 13a of inflow path 13 and inlet 14a of outflow path 14 in the Z direction. Specifically, inlet 14a of outflow path 14 is disposed at a position higher than outlet 13a of inflow path 13 in the Z direction, and collision member 101 is disposed between inlet 14a and outlet 13a in the Z direction. As collision member 101 is disposed in this manner, the flow of the refrigerant flowing out from outlet 13a of inflow path 13 may be dispersed at a position away from outflow path 14, and it is possible to prevent the refrigerant from directly entering outflow path 14.

Air bubble mixing prevention member 100 is disposed within tank main body 16 so as to face inlet 14a of outflow path 14. Air bubble mixing prevention member 100 is provided in order to prevent bubbles (air) from being mixed into outflow path 14.

As illustrated in FIG. 6C, air bubble mixing prevention member 100 includes lid portion 102a and air bubble mixing prevention wall 102b. Lid portion 102a is disposed so as to face inlet 14a of outflow path 14. By providing lid portion 102a, it is possible to restrict inflow of the refrigerant into outflow path 14 in the Z direction. Air bubble mixing prevention wall 102b is a cylindrical member disposed so as to surround inlet 14a of outflow path 14 and lid portion 102a. In the present exemplary embodiment, air bubble mixing prevention wall 102b has a shape in which a circle is cut out when viewed in the Z direction. With such a shape, since there is a portion where a gap between air bubble mixing prevention wall 102b and inlet 14a of outflow path 14 is large, a pressure loss of the refrigerant flowing into inlet 14a may be prevented. Further, near notch 14c of inlet 14a to be described later, a gap between air bubble mixing prevention wall 102b and inlet 14a may be reduced, and therefore bubbles in the refrigerant flowing into inlet 14a may be removed while the pressure loss of the refrigerant is prevented. There is a gap between an outer periphery of lid portion 102a and air bubble mixing prevention wall 102b, and the refrigerant is allowed to pass through the gap. Air bubble mixing prevention wall 102b may restrict the inflow of the refrigerant in an X direction and an Y direction with respect to outflow path 14.

Inlet 14a of outflow path 14 is provided with notch 14c (see FIG. 4). Since notch 14c is defined in inlet 14a of outflow path 14, a gap may be provided between lid portion 102a and inlet 14a even when lid portion 102a is disposed close to inlet 14a of outflow path 14. By providing air bubble mixing prevention member 100, the refrigerant flows along air bubble mixing prevention wall 102b and enters outflow path 14 through notch 14c (arrow F4 in FIG. 6C). At this time, since air bubble mixing prevention wall 102b is provided such that the gap with notch 14c of inlet 14a becomes small as described above, it is possible to prevent air bubbles from entering inlet 14a of outflow path 14 by lid portion 102a. In addition, since a gap between an outer wall of outflow path 14 and air bubble mixing prevention wall 102b is small, it is possible to suppress bubbles in the refrigerant from passing through the gap, and prevent the bubbles from being mixed into outflow path 14. In this manner, air bubble mixing prevention member 100 prevents bubbles from getting into outflow path 14.

In the present exemplary embodiment, as shown in FIG. 7, air bubble mixing prevention member 100 and collision member 101 are provided integrally. Air bubble mixing prevention member 100 and collision member 101 are connected by connecting portion 100a extending from outside air bubble mixing prevention wall 102b. Connecting portion 100a is configured such that connecting portion 100a rises from collision member 101 in the Z direction, and separates a flow path of the refrigerant flowing in the Z direction from the two through holes 103. In this manner, a structure of tank main body 16 may be simplified by providing air bubble mixing prevention member 100 and collision member 101 integrally.

Further, two pedestal portions 100b extend from air bubble mixing prevention wall 102b in the Y direction. These portions serve as a base when air bubble mixing prevention member 100 is attached to tank main body 16.

Operation of Reservoir Tank

Here, an operation of reservoir tank 10 will be described.

The refrigerant cooled by heat exchanger 40 passes through refrigerant transport path 50a and flows into reservoir tank 10. The refrigerant from refrigerant transport path 50a enters reservoir tank 10 through the inlet 13b of inflow path 13. The refrigerant that has entered inflow path 13 passes through first inflow path 13c, reduces the flow velocity through second inflow path 13d, and flows out from outlet 13a of inflow path 13 into tank main body 16.

A part of the refrigerant that flows from outlet 13a of inflow path 13 collides against first surface 101a of collision member 101, changes the traveling direction, and flows out into tank main body 16 (arrow F2 in FIG. 5B). On the other hand, another part of the refrigerant that flows out from outlet 13a of inflow path 13 passes through the through hole 103 defined in collision member 101 and flows to the side opposite to first surface 101a (arrow F3 in FIG. 5B).

By disposing collision member 101 at a position facing outlet 13a of inflow path 13, the flow velocity of the refrigerant flowing into tank main body 16 is reduced. Further, since the refrigerant colliding against collision member 101 changes the traveling direction of the refrigerant, it is possible to reduce shaking of interface 3a between the refrigerant and air within tank main body 16 illustrated in FIG. 6B. When interface 3a shakes, air bubbles are likely to be mixed into the refrigerant flowing out from outflow path 14. However, in the present exemplary embodiment, since collision member 101 is disposed, shaking of interface 3a is reduced and gas-liquid separation performance is improved. By disposing collision member 101, it is also possible to reduce shaking of interface 3a even when the flow rate of the refrigerant is increased. Therefore, the flow rate of the refrigerant may be increased to improve cooling performance without increasing a size of reservoir tank 10 itself.

The refrigerant within tank main body 16 passes through air bubble mixing prevention member 100 and is discharged outside tank main body 16 from inlet 14a of outflow path 14 via outflow path 14. At this time, by air bubble mixing prevention wall 102b disposed so as to surround inlet 14a of outflow path 14, it is possible to prevent air bubbles from getting into outflow path 14.

The refrigerant discharged outside tank main body 16 passes through refrigerant transport path 50b and flows to heat receiving unit 30.

Effects

According to the exemplary embodiment described above, reservoir tank 10 includes tank main body 16, inflow path 13, outflow path 14, collision member 101, and air bubble mixing prevention member 100. Collision member 101 is disposed so as to face outlet 13a of inflow path 13. With such a configuration, it is possible to cause the refrigerant flowing out from inflow path 13 into tank main body 16 to collide against collision member 101 to reduce the flow velocity of the refrigerant, and to prevent interface 3a between the refrigerant and air within tank main body 16 from shaking. As a result, it is possible to prevent air bubbles from being mixed into the refrigerant flowing out from tank main body 16 without increasing a size of tank main body 16. Therefore, it is possible to provide reservoir tank 10 with reduced size and improved gas-liquid separation performance.

Further, inflow path 13 includes first inflow path 13c into which the refrigerant flows from outside tank main body 16, and second inflow path 13d connected to outlet 13a from first inflow path 13c. A cross section of second inflow path 13d is larger than a cross section of first inflow path 13c. With such a configuration, it is possible to reduce the flow velocity of the refrigerant in second inflow path 13d. Since the flow velocity is reduced in second inflow path 13d and the refrigerant flows out from outlet 13a of inflow path 13 with reduced flow velocity, it is possible to reduce an influence of the refrigerant flowing from outlet 13a on interface 3a.

Moreover, collision member 101 has first surface 101a against which the refrigerant flowing out from inflow path 13 collides. First surface 101a of collision member 101 is provided in a planar shape. By the refrigerant colliding against first surface 101a of collision member 101, the refrigerant may change the traveling direction. Therefore, it is possible to reduce the flow rate of the refrigerant that directly flows along interface 3a between the refrigerant and air and, thus, to reduce the influence of the refrigerant on interface 3a.

Furthermore, inlet 14a of outflow path 14 is disposed within tank main body 16 at the position away from inner wall 11w of tank main body 16. Since inlet 14a of outflow path 14 is disposed at the position away from inner wall 11w of tank main body 16, inlet 14a of outflow path 14 is positioned on a side of the refrigerant from interface 3a between the refrigerant and air regardless of the direction in which reservoir tank 10 is placed. That is, inlet 14a of outflow path 14 is always disposed in the refrigerant. Therefore, it is possible to deliver gas-liquid separation performance no matter which direction reservoir tank 10 is used.

Further, collision member 101 is provided with the through hole 103 that moves the refrigerant from first surface 101a toward the side opposite to first surface 101a. With such a configuration, a part of the refrigerant may collide against collision member 101 and change the traveling direction, and another part of the refrigerant may pass through the through hole 103. As the refrigerant is dispersed and caused to flow into tank main body 16, it is possible to reduce the flow velocity of the refrigerant as a whole, and to suppress the flow deviation.

Moreover, outlet 13a of inflow path 13 and inlet 14a of outflow path 14 are disposed toward the Z direction (first direction), outlet 13a of inflow path 13 is provided at a position different from a position of inlet 14a of outflow path 14 in the Z direction, and collision member 101 is disposed between outlet 13a of inflow path 13 and inlet 14a of outflow path 14 in the Z direction. With such a configuration, it is possible to prevent the refrigerant whose traveling direction has been changed by first surface 101a of collision member 101 from directly reaching inlet 14a of outflow path 14.

Moreover, collision member 101 is provided integrally with air bubble mixing prevention member 100. With such a configuration, it is possible to easily prevent the refrigerant from affecting interface 3a while the structure of tank main body 16 is simplified.

While the above-described exemplary embodiment describes the example in which the two through holes 103 are defined in collision member 101, collision member 101 may be provided with one or more through holes 103.

Second Exemplary Embodiment

A second exemplary embodiment will be described with reference to FIGS. 8A to 10. In the second exemplary embodiment, the same or equivalent configurations as those in the first exemplary embodiment are denoted by the same reference numerals as those in the first exemplary embodiment. In the second exemplary embodiment, the description overlapping with the first exemplary embodiment is omitted.

Figure 8A:
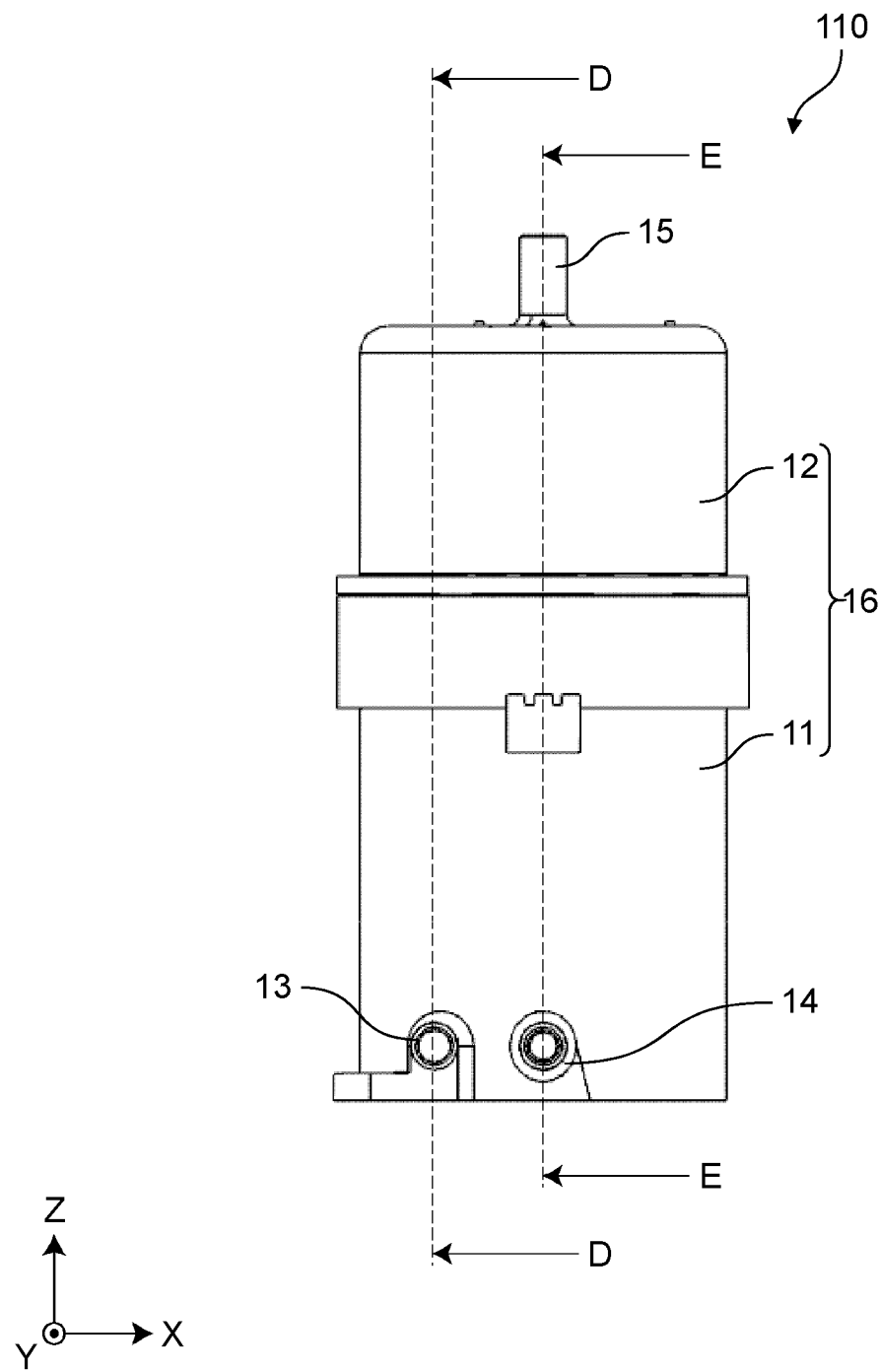
FIG. 8A is a plan view illustrating a reservoir tank according to a second exemplary embodiment.
Figure 8B:
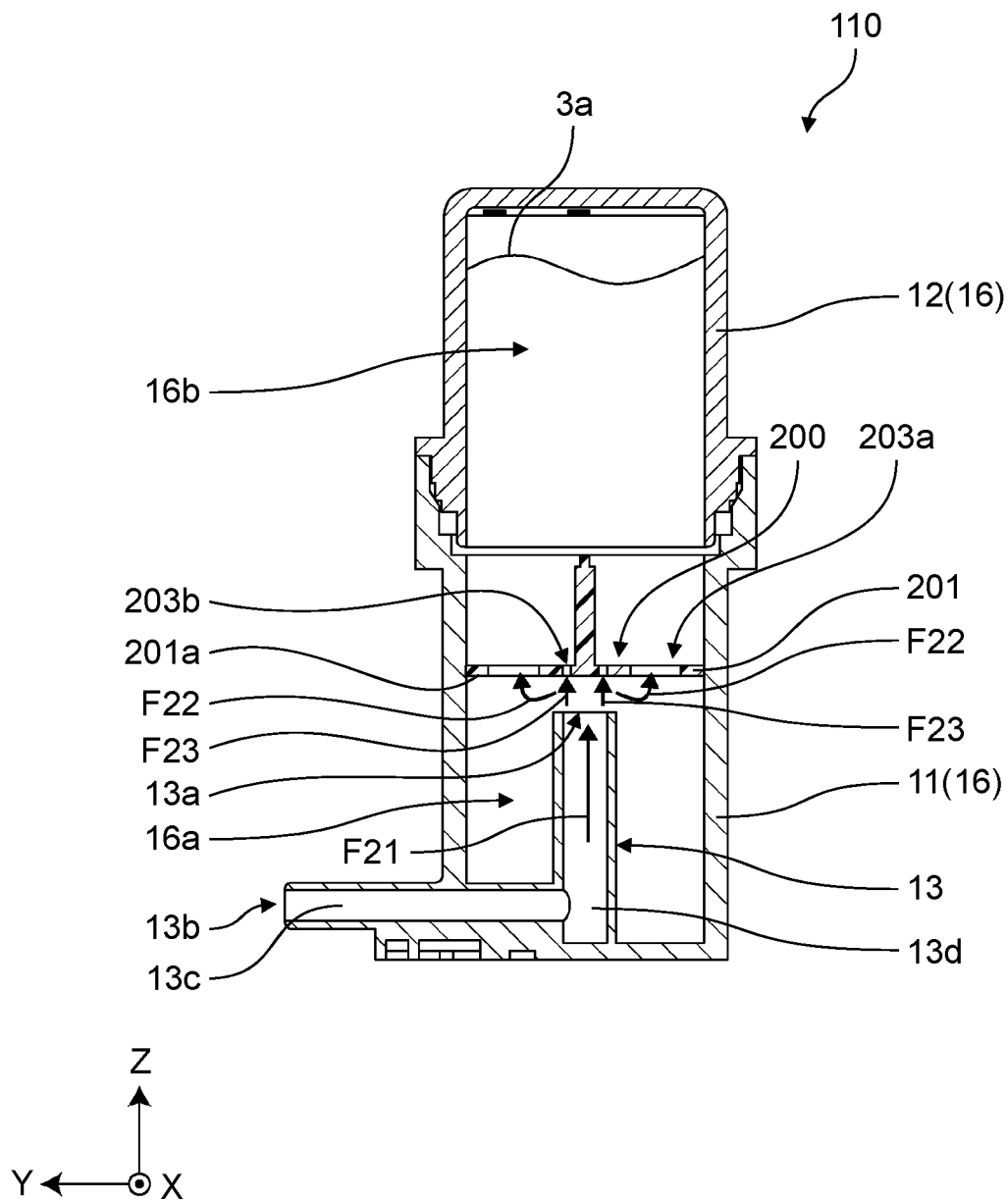
FIG. 8B is a cross-sectional view of the reservoir tank of FIG. 8A taken along line D-D.
Figure 8C:
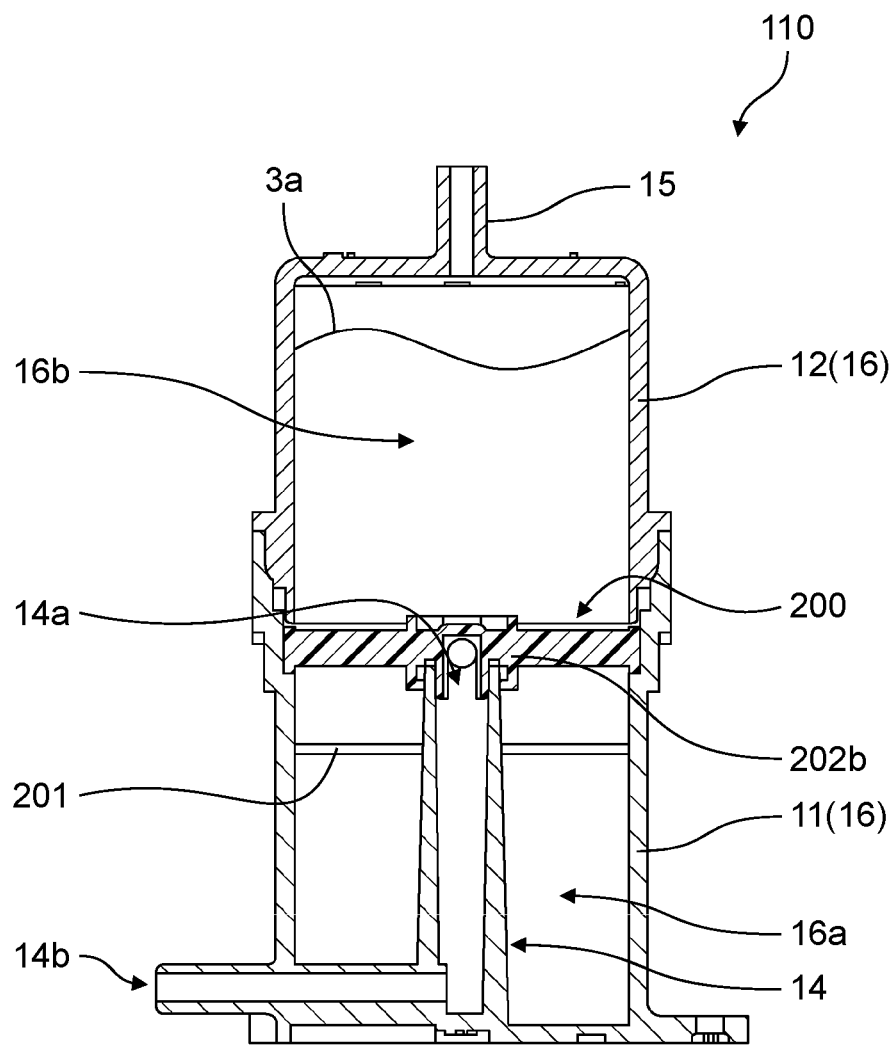
FIG. 8C is a cross-sectional view of the reservoir tank of FIG. 8A taken along line E-E.
Figure 9A:
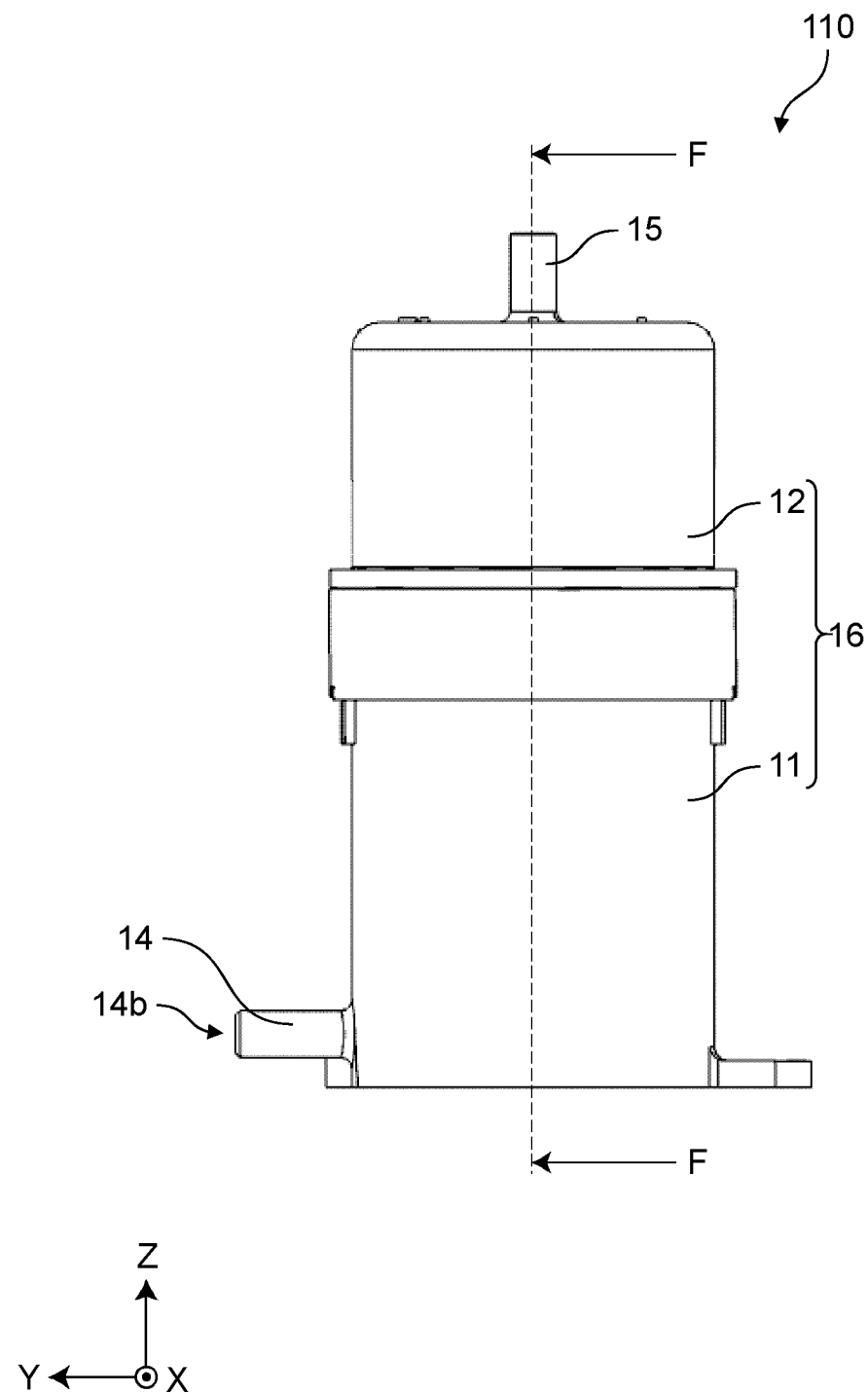
FIG. 9A is a plan view of the reservoir tank of FIG. 8A viewed from another direction.
Figure 9B:
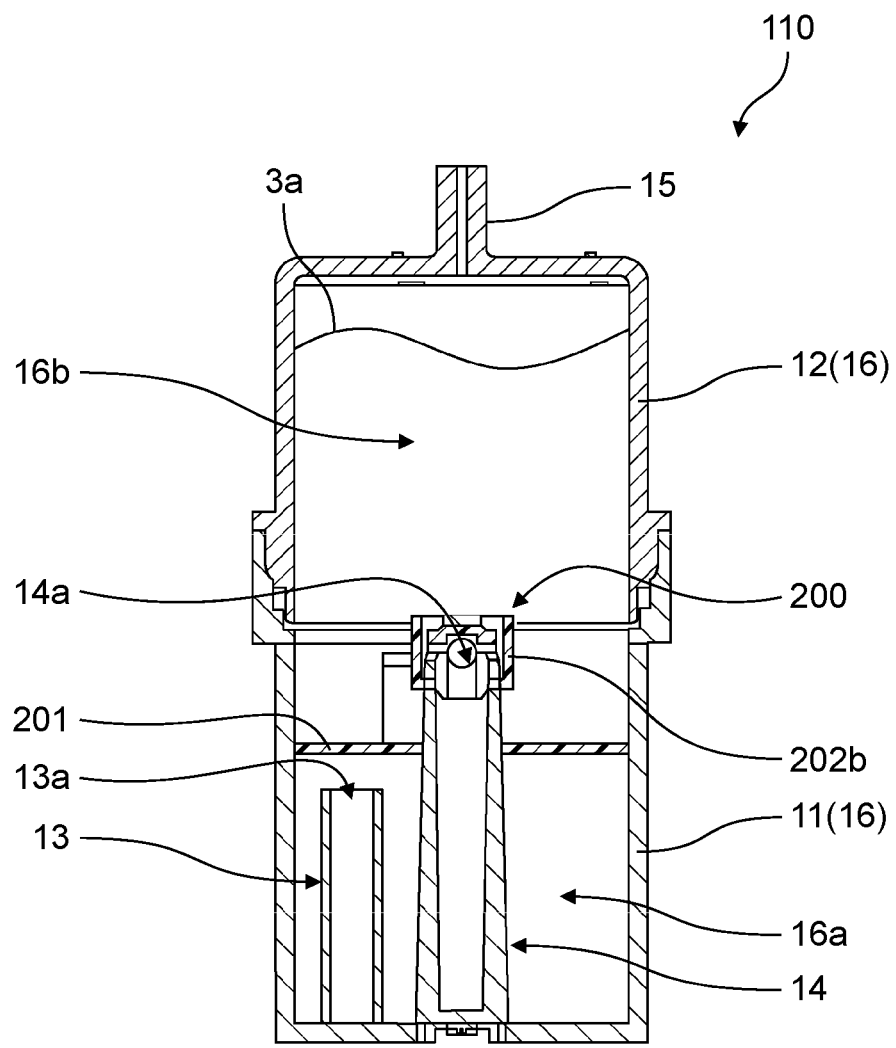
FIG. 9B is a cross-sectional view of the reservoir tank of FIG. 9A taken along line F-F.
Figure 10:
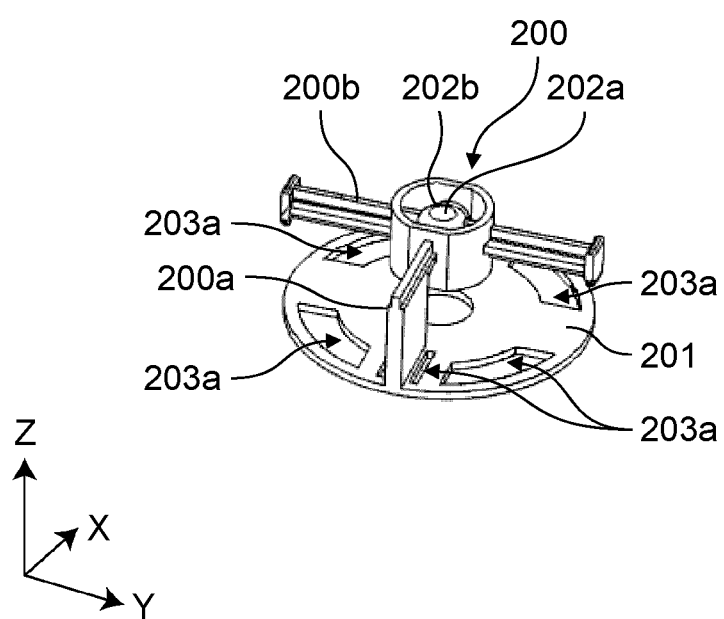
FIG. 10 is a perspective view illustrating an air bubble mixing prevention member and a collision member included in the reservoir tank of FIG. 8A.

FIG. 8A is a plan view illustrating reservoir tank 110 according to the second exemplary embodiment. FIG. 8B is a cross-sectional view of reservoir tank 110 of FIG. 8A taken along line D-D. FIG. 8C is a cross-sectional view of reservoir tank 110 of FIG. 8A taken along line E-E. FIG. 9A is a plan view of reservoir tank 110 of FIG. 8A viewed from another direction. FIG. 9B is a cross-sectional view of reservoir tank 110 of FIG. 9A taken along line F-F. FIG. 10 is a perspective view illustrating air bubble mixing prevention member 200 and collision member 201 included in reservoir tank 110 of FIG. 8A.

The second exemplary embodiment is different from the first exemplary embodiment in a shape of collision member 201. In the second exemplary embodiment, first region 16a where outlet 13a of inflow path 13 is disposed and second region 16b where inlet 14a of outflow path 14 is disposed are provided within tank main body 16. First region 16a and second region 16b are partitioned by collision member 201. A plurality of through holes 203a and 203b are defined in collision member 201, and first region 16a and second region 16b communicate with each other via through holes 203a and 203b.

As shown in FIGS. 8B to 8C and FIG. 9B, in the present exemplary embodiment, collision member 201 is disposed so as to divide an interior of tank main body 16 into two regions. Outlet 13a of inflow path 13 is disposed in first region 16a, and inlet 14a of outflow path 14 is disposed in second region 16b. Therefore, collision member 201 partitions the interior of tank main body 16 into a region (first region 16a) in which the refrigerant flows from outside into tank main body 16 and a region (second region 16b) in which the refrigerant flows outside from tank main body 16.

Since outlet 13a of inflow path 13 and inlet 14a of outflow path 14 are disposed in different regions separated by collision member 201, it is possible to prevent the refrigerant that flows into tank main body 16 through outlet 13a of inflow path 13 from directly flowing out from tank main body 16 from inlet 14a of outflow path 14.

As illustrated in FIG. 10, in the present exemplary embodiment, collision member 201 has a disk shape. Four of through holes 203a are defined along an outer periphery of collision member 201 in a disk shape. Further, through hole 203b is defined at a position facing outlet 13a of inflow path 13 when collision member 201 is disposed in tank main body 16.

A part of the refrigerant that flows out from outlet 13a through inflow path 13 (arrow F21 in FIG. 8B) collides against first surface 201a of collision member 201, changes the traveling direction, and flows to second region 16b through through holes 203a (arrow F22 in FIG. 8B). Another part of the refrigerant that flows out from outlet 13a through inflow path 13 (arrow F21 in FIG. 8B) flows to second region 16b through through hole 203b (arrow F23 in FIG. 8B).

Since the four through holes 203a are provided, the refrigerant that flows into first region 16a from outside tank main body 16 may flow into second region 16b. Instead of the refrigerant that flows out through outlet 13a of inflow path 13 directly flowing into second region 16b, the refrigerant first flows into first region 16a, and then flows into second region 16b via through holes 203a and 203b. Therefore, it is possible to suppress shaking of interface 3a between the refrigerant and air.

A sum of opening areas of the plurality of through holes 203a and 203b of collision member 201 is larger than an opening area of outlet 13a of inflow path 13. Defining through holes 203 in this manner may reduce the flow velocity of the refrigerant that flows into tank main body 16. As a result, it is possible to reduce shaking of interface 3a between the refrigerant and air, and to improve gas-liquid separation performance.

Third Exemplary Embodiment

A third exemplary embodiment will be described with reference to FIGS. 11A to 13. In the third exemplary embodiment, the same or equivalent configurations as those in the first exemplary embodiment are denoted by the same reference numerals as those in the first exemplary embodiment. In the third exemplary embodiment, the description overlapping with the first exemplary embodiment is omitted.

Figure 11A:
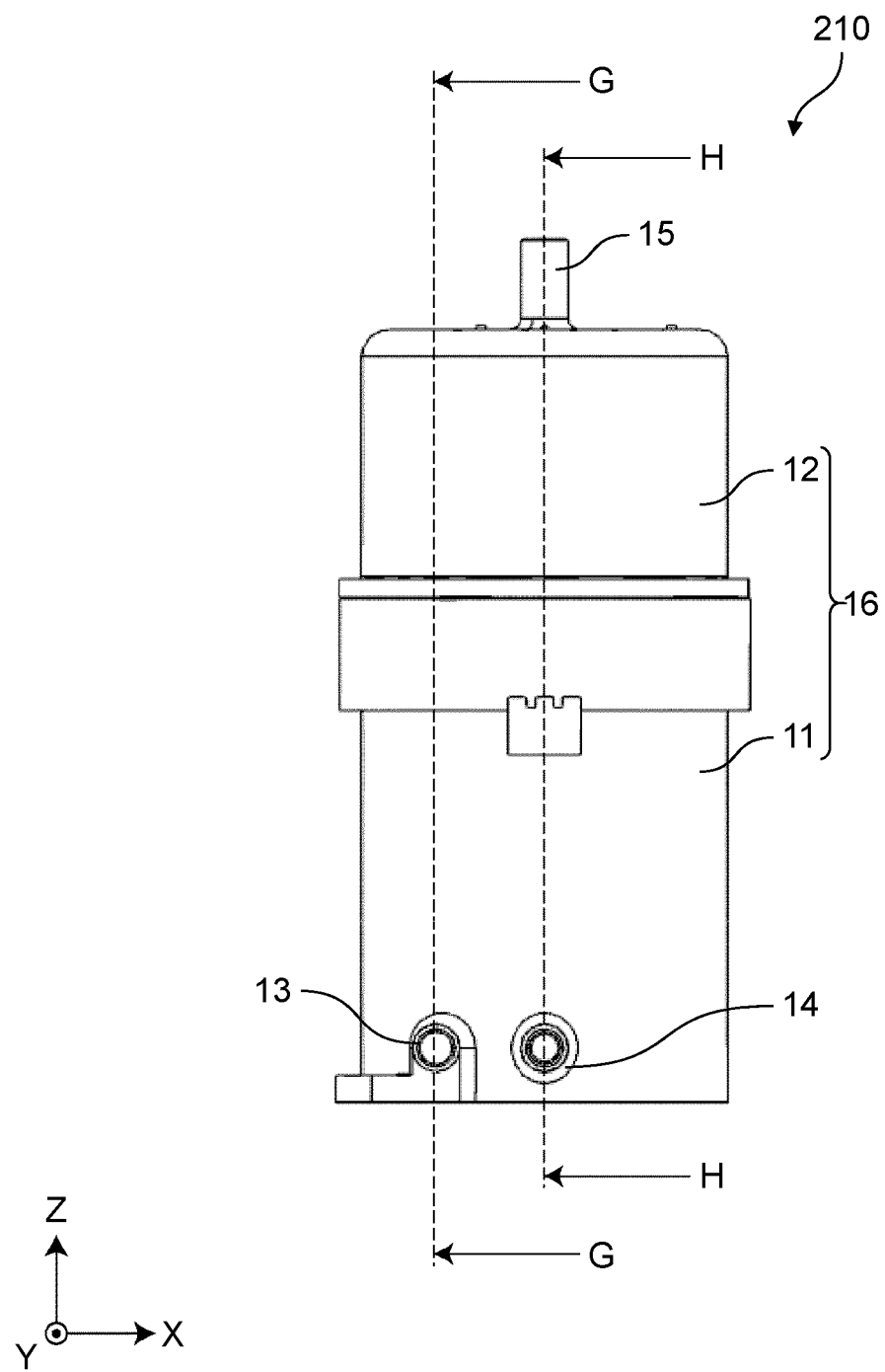
FIG. 11A is a plan view illustrating a reservoir tank according to a third exemplary embodiment.
Figure 11B:
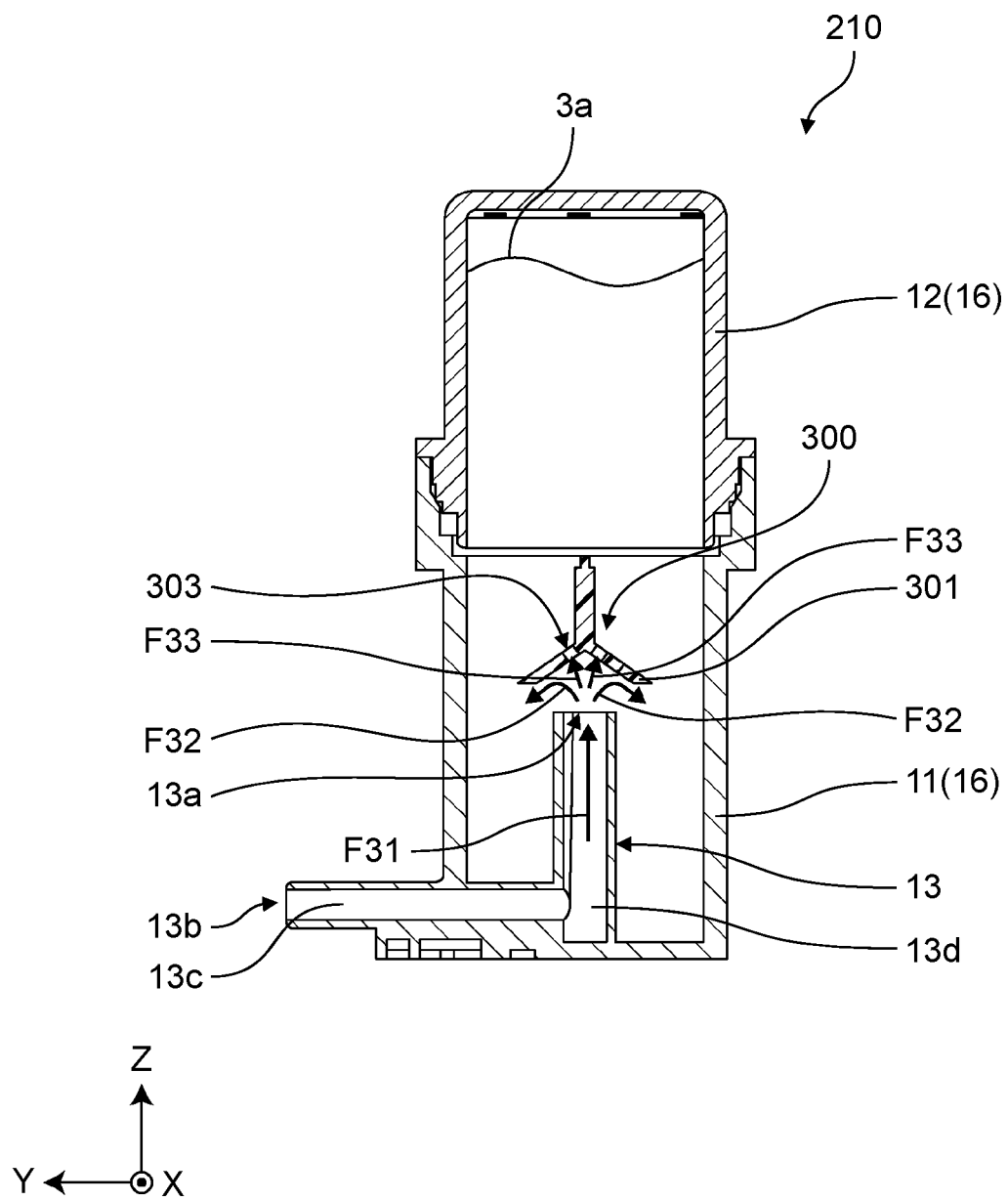
FIG. 11B is a cross-sectional view of the reservoir tank of FIG. 11A taken along line G-G.
Figure 11C:
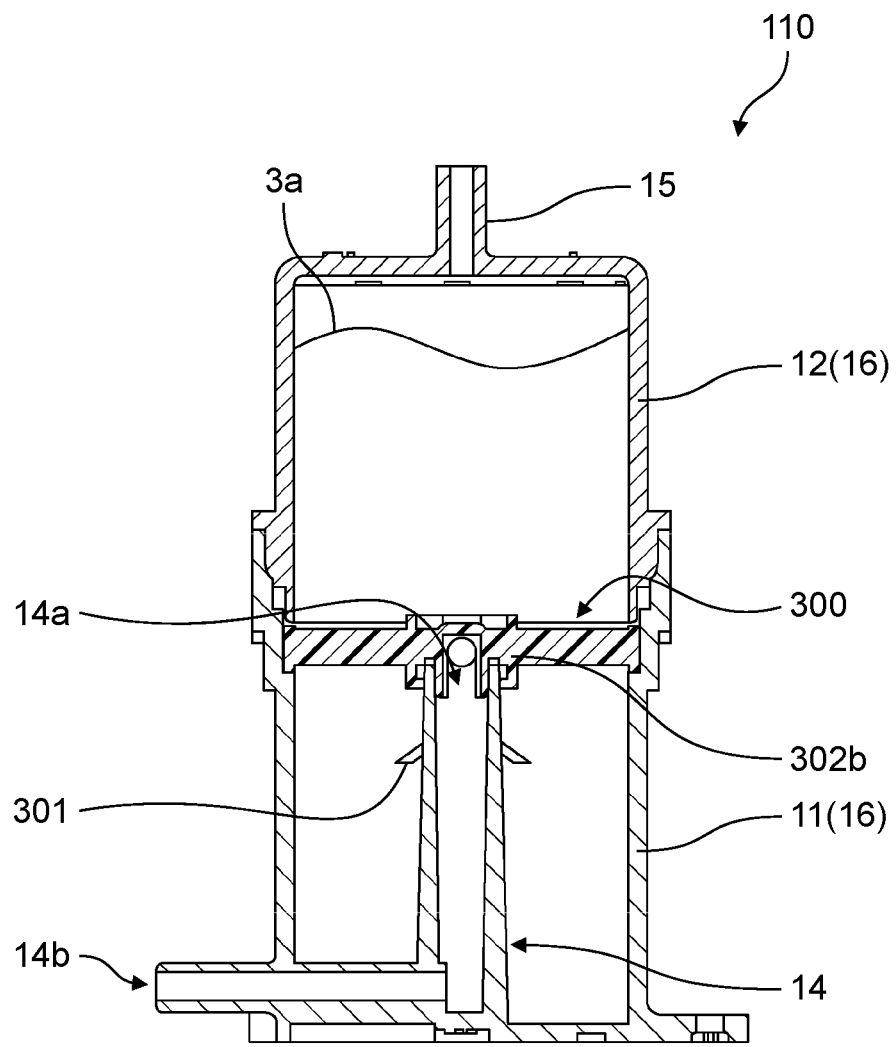
FIG. 11C is a cross-sectional view of the reservoir tank of FIG. 11A taken along line H-H.
Figure 12A:
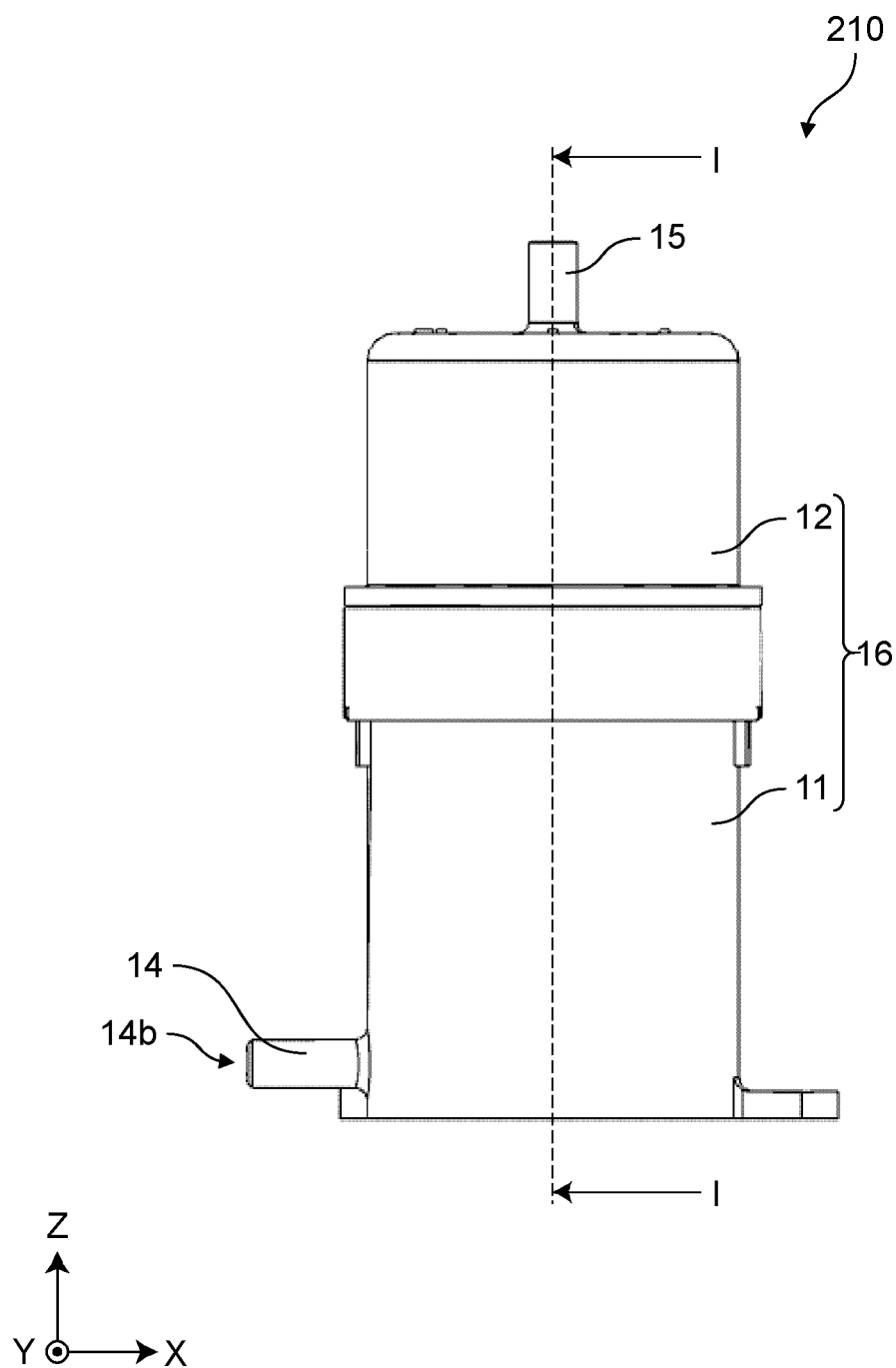
FIG. 12A is a plan view of the reservoir tank of FIG. 11A viewed from another direction.
Figure 12B:
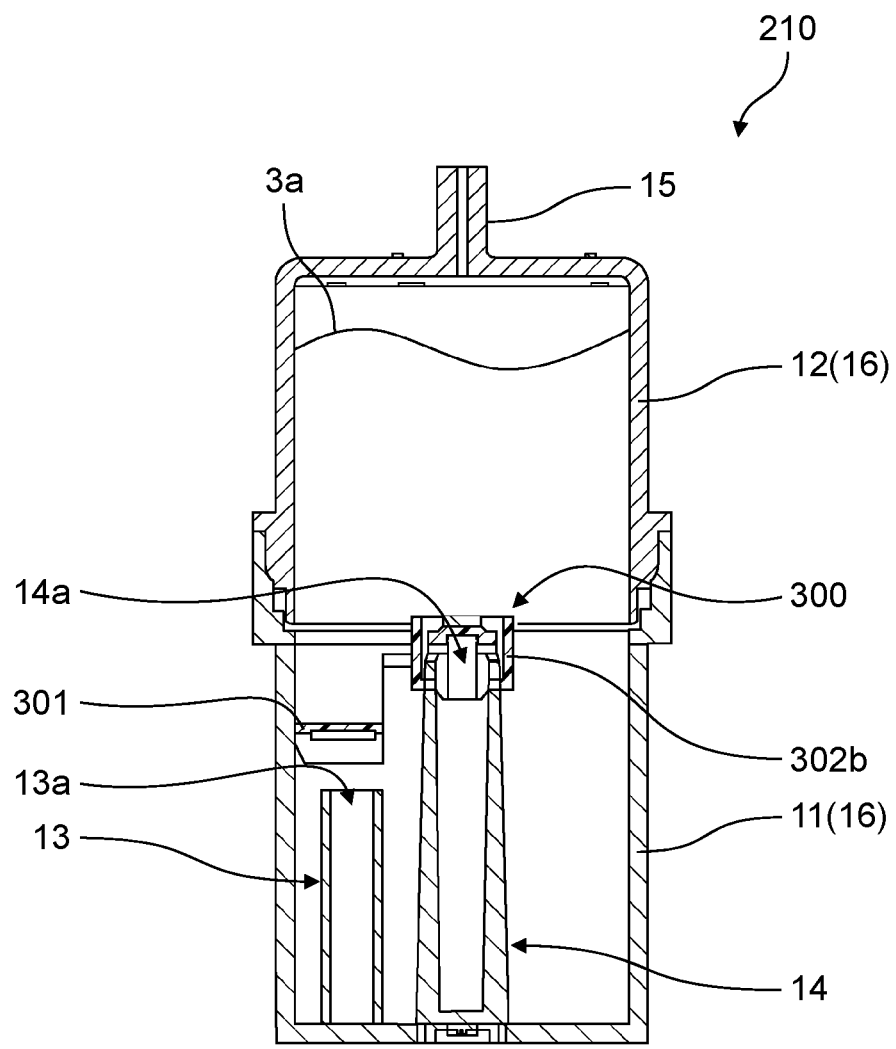
FIG. 12B is a cross-sectional view of the reservoir tank of FIG. 12A taken along line I-I.
Figure 13:
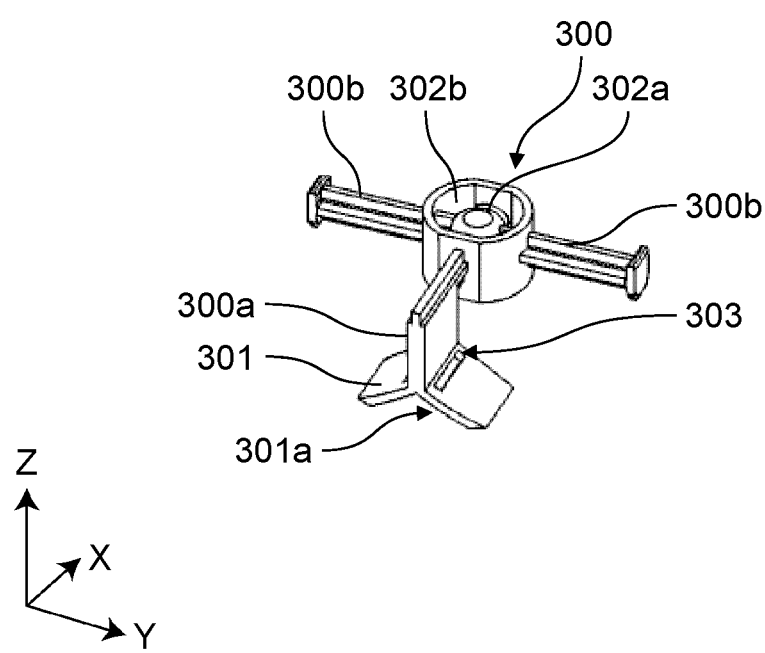
FIG. 13 is a perspective view illustrating an air bubble mixing prevention member and a collision member included in the reservoir tank of FIG. 11A.

FIG. 11A is a plan view illustrating reservoir tank 210 according to a third exemplary embodiment. FIG. 11B is a cross-sectional view of reservoir tank 210 of FIG. 11A taken along line G-G. FIG. 11C is a cross-sectional view of reservoir tank 210 of FIG. 11A taken along line H-H. FIG. 12A is a plan view of reservoir tank 210 of FIG. 11A viewed from another direction. FIG. 12B is a cross-sectional view of reservoir tank 210 of FIG. 12A taken along line I-I. FIG. 13 is a perspective view illustrating air bubble mixing prevention member 300 and collision member 301 included in reservoir tank 210 of FIG. 11A.

The third exemplary embodiment is different from the first exemplary embodiment in that first surface 301a of collision member 301 is provided in a concave shape.

As shown in FIGS. 11B and 13, first surface 301a of collision member 301 is provided in a concave shape with respect to outlet 13a of inflow path 13. In this case, a part of the refrigerant that flows out from outlet 13a of inflow path 13 into tank main body 16 (arrow F31 in FIG. 11B) collides against first surface 301a of collision member 301, and changes the traveling direction, and flows into tank main body 16 (arrow F32 in FIG. 11B). Further, another part of the refrigerant that flows out from outlet 13a of inflow path 13 into tank main body 16 (arrow F31 in FIG. 11B) passes through through hole 303 provided for collision member 301 and flows into tank main body 16 (arrow F33 in FIG. 11B).

Providing first surface 301a of collision member 301 with such a shape reduces a resistance of the flow after the refrigerant that flows out from outlet 13a of inflow path 13 collides against first surface 301a. Therefore, it is possible to achieve the same effects as those of the first exemplary embodiment while reducing the pressure loss.

Fourth Exemplary Embodiment

A fourth exemplary embodiment will be described with reference to FIGS. 14A to 16. In the fourth exemplary embodiment, the same or equivalent configurations as those in the third exemplary embodiment are denoted by the same reference numerals as those in the third exemplary embodiment. In the fourth exemplary embodiment, the description overlapping with the third exemplary embodiment is omitted.

Figure 14A:
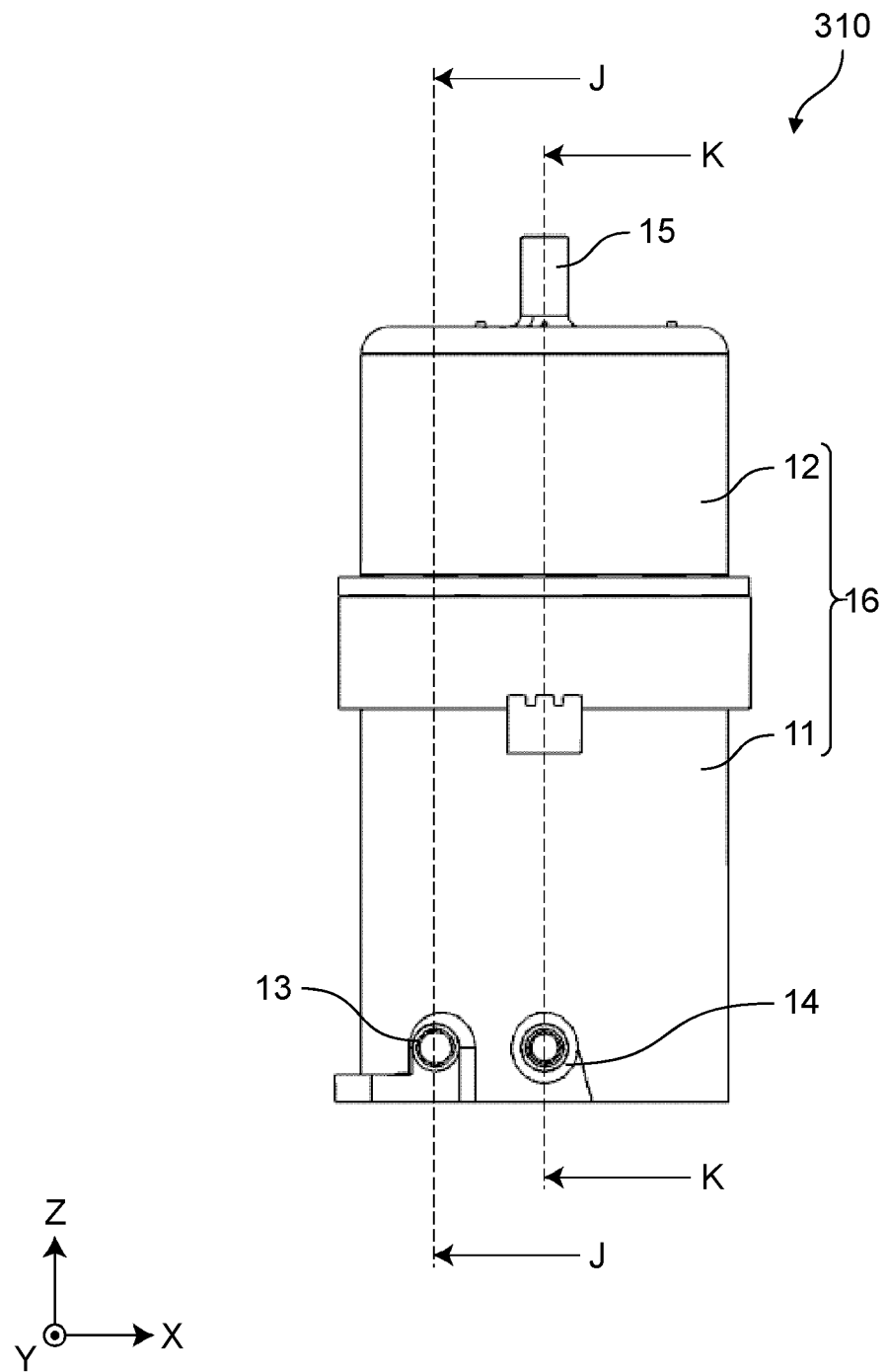
FIG. 14A is a plan view illustrating a reservoir tank according to a fourth exemplary embodiment.
Figure 14B:
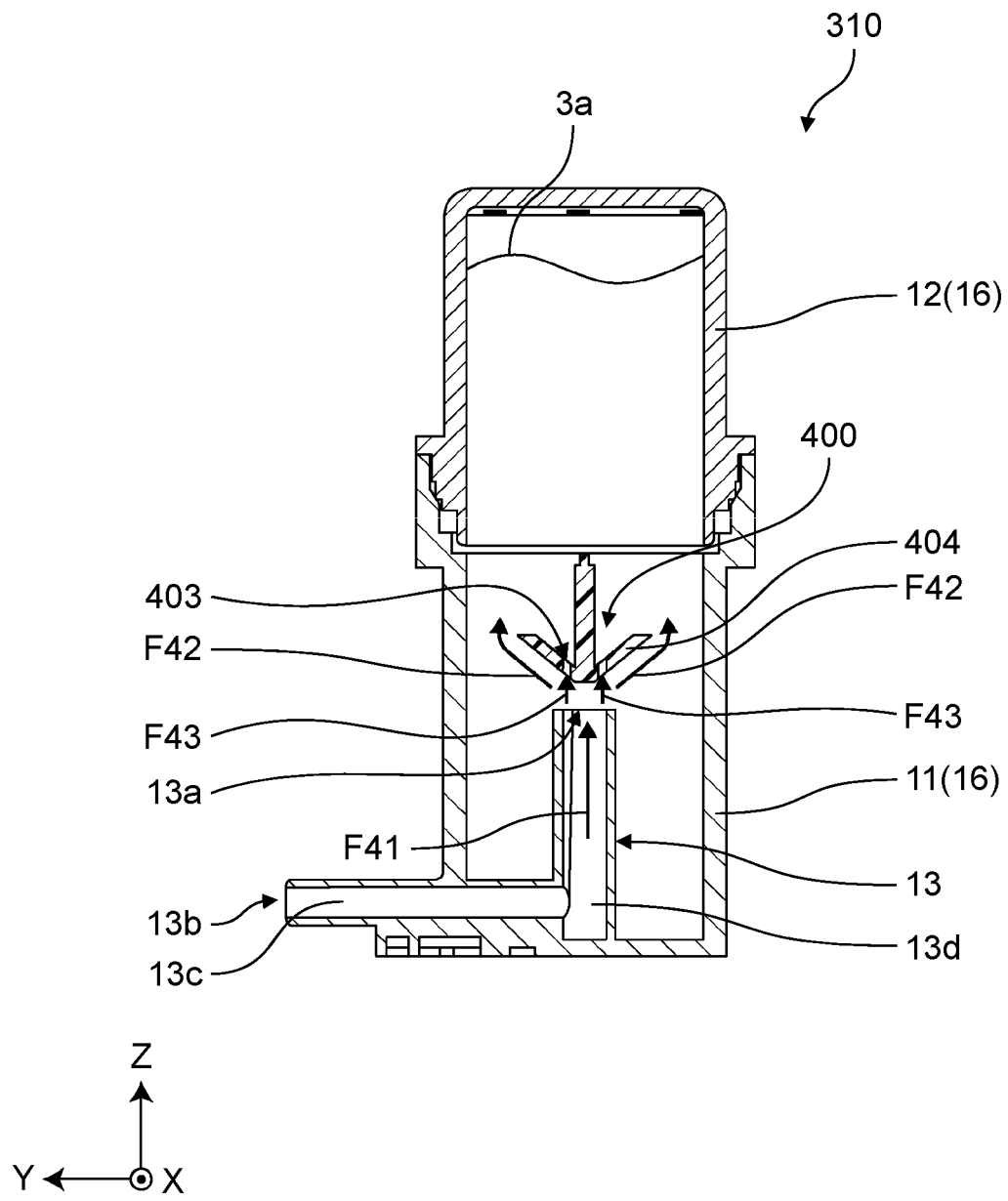
FIG. 14B is a cross-sectional view of the reservoir tank of FIG. 14A taken along line J-J.
Figure 14C:
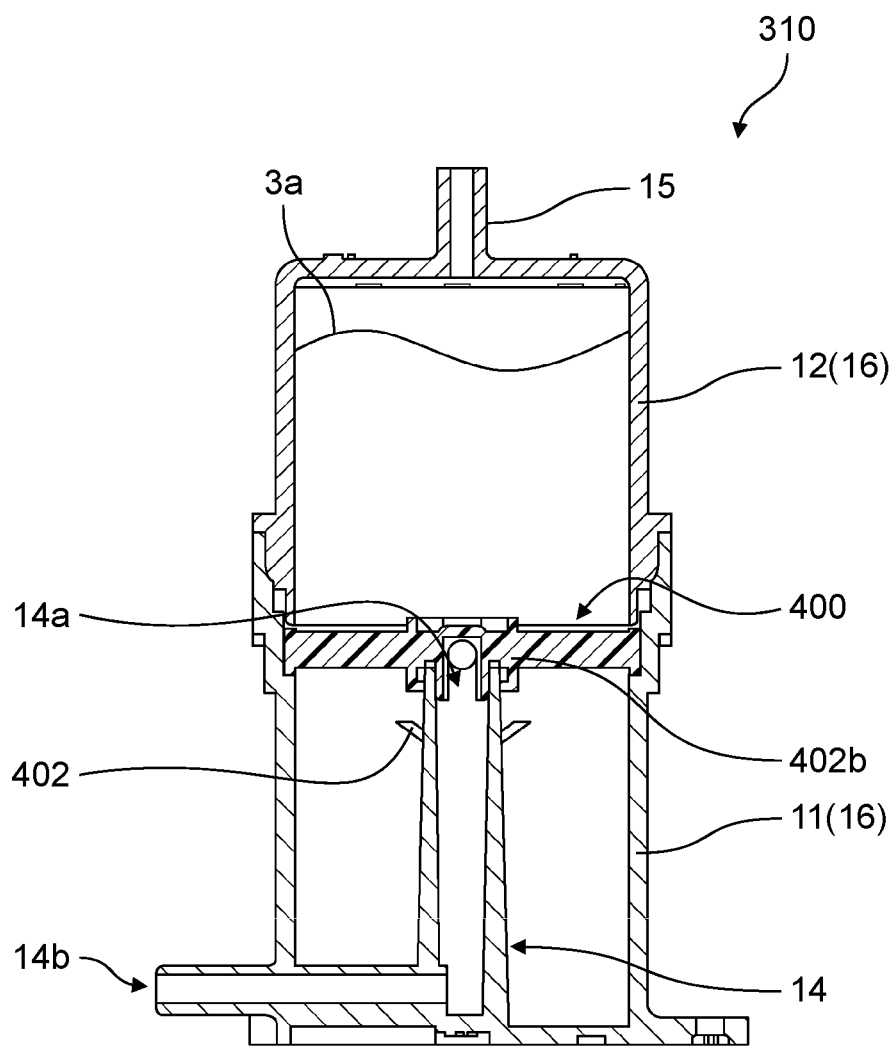
FIG. 14C is a cross-sectional view of the reservoir tank of FIG. 14A taken along line K-K.
Figure 15A:
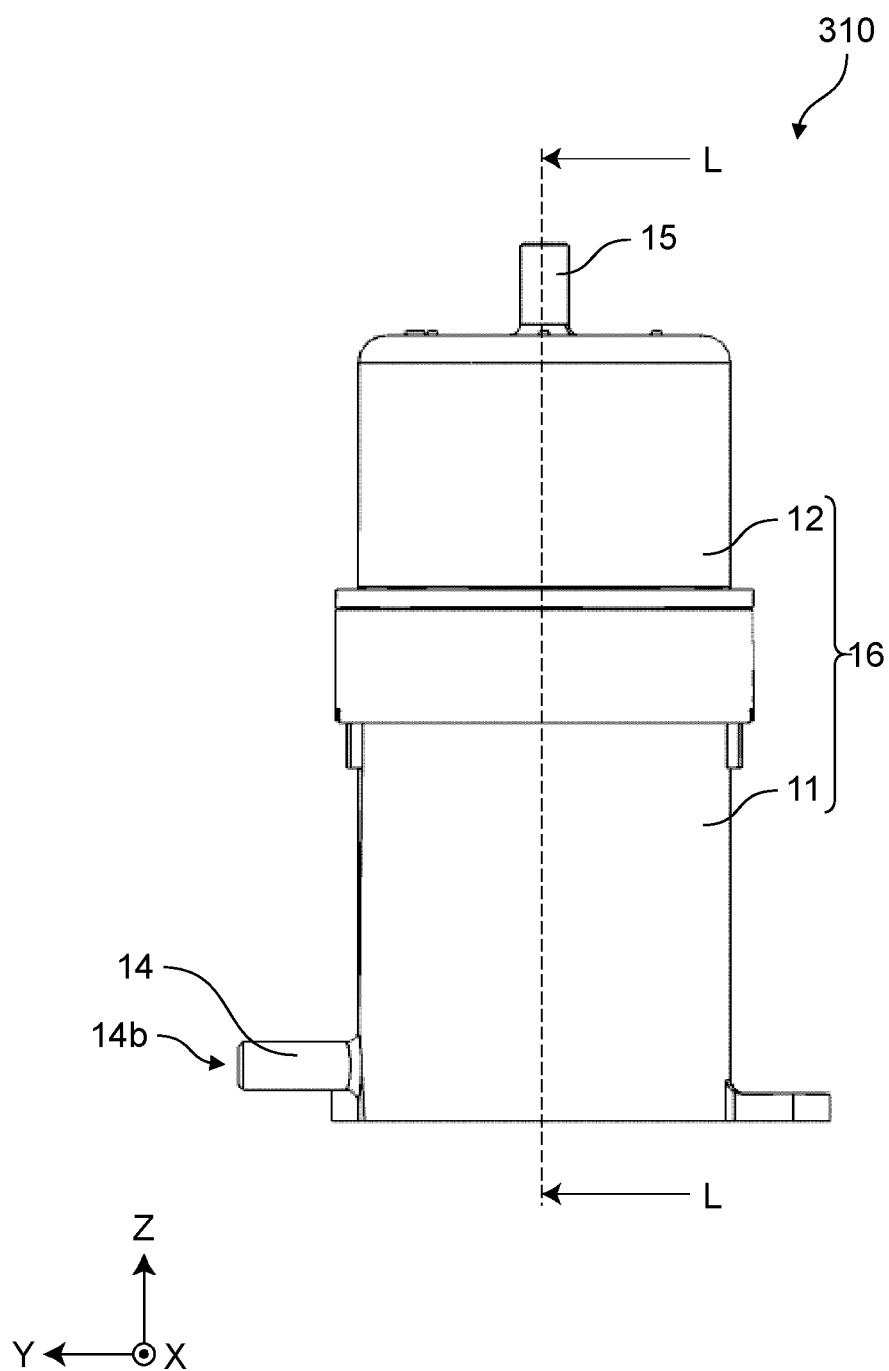
FIG. 15A is a plan view of the reservoir tank of FIG. 14A viewed from another direction.
Figure 15B:
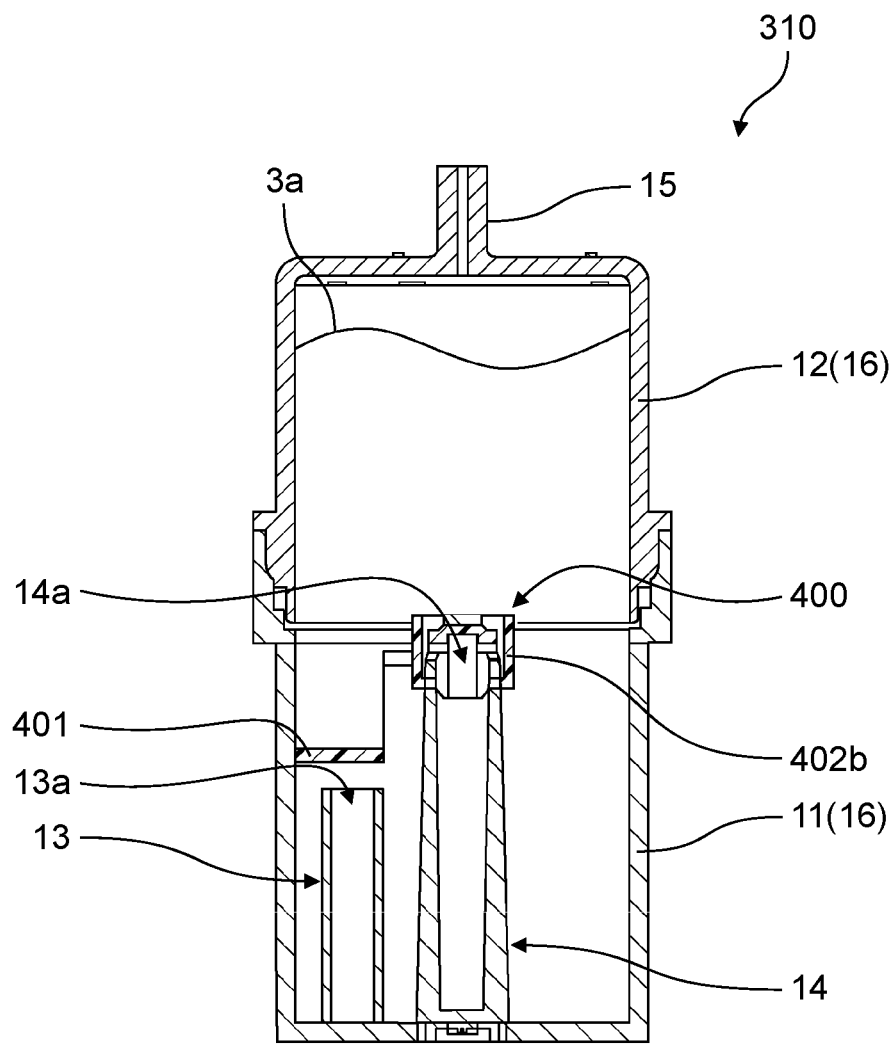
FIG. 15B is a cross-sectional view of the reservoir tank of FIG. 15A taken along line L-L.
Figure 16:
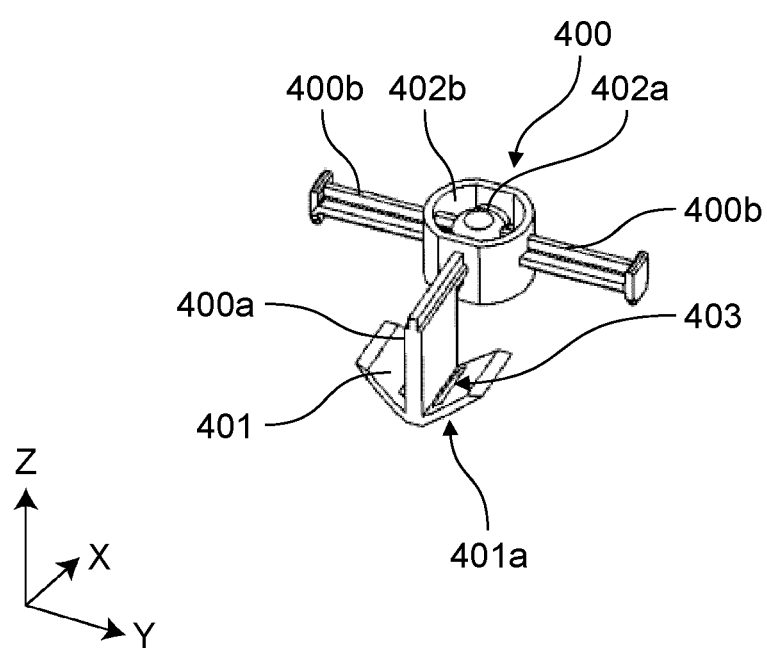
FIG. 16 is a perspective view illustrating an air bubble mixing prevention member and a collision member included in the reservoir tank of FIG. 14A.

FIG. 14A is a plan view illustrating reservoir tank 310 according to a fourth exemplary embodiment. FIG. 14B is a cross-sectional view of reservoir tank 310 of FIG. 14A taken along line J-J. FIG. 14C is a cross-sectional view of reservoir tank 310 of FIG. 14A taken along line K-K. FIG. 15A is a plan view of reservoir tank 310 of FIG. 14A viewed from another direction. FIG. 15B is a cross-sectional view of reservoir tank 310 of FIG. 15A taken along line L-L. FIG. 16 is a perspective view illustrating air bubble mixing prevention member 400 and collision member 401 included in reservoir tank 310 of FIG. 14A.

The fourth exemplary embodiment is different from the third exemplary embodiment in that a first surface 401a of collision member 401 is provided in a convex shape.

As shown in FIGS. 14B and 16, the first surface 401a of collision member 401 is provided in a convex shape with respect to outlet 13a of inflow path 13. In this case, a part of the refrigerant that flows out from outlet 13a of inflow path 13 into tank main body 16 (arrow F41 in FIG. 14B) collides against the first surface 401a of collision member 401, and changes the traveling direction, and flows into tank main body 16 (arrow F42 in FIG. 14B). Further, another part of the refrigerant that flows out from outlet 13a of inflow path 13 into tank main body 16 (arrow F41 in FIG. 14B) passes through through hole 403 provided for collision member 401 and flows into tank main body 16 (arrow F43 in FIG. 14B).

Providing the first surface 401a of collision member 401 with such a shape reduces a resistance of the flow after the refrigerant that flows out from outlet 13a of inflow path 13 collides against the first surface 401a. Therefore, it is possible to achieve the same effects as those of the third exemplary embodiment while reducing the pressure loss.

Fifth Exemplary Embodiment

A fifth exemplary embodiment will be described with reference to FIGS. 17A to 20. In the fifth exemplary embodiment, the same or equivalent components as those in the first exemplary embodiment are denoted by the same reference numerals as those in the first exemplary embodiment. In the fifth exemplary embodiment, the description overlapping with the first exemplary embodiment is omitted.

Figure 17A:
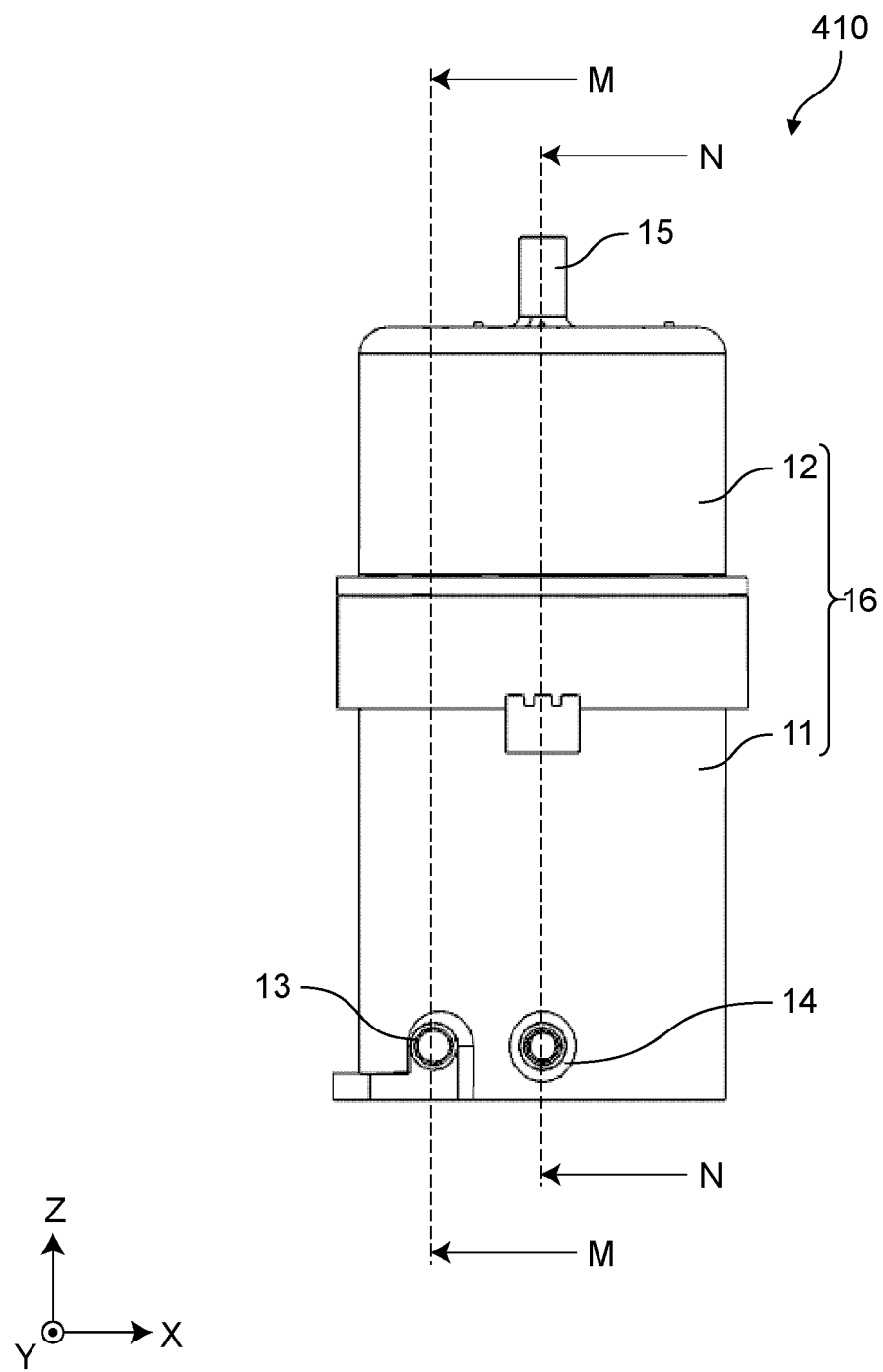
FIG. 17A is a plan view illustrating a reservoir tank according to a fifth exemplary embodiment.
Figure 17B:
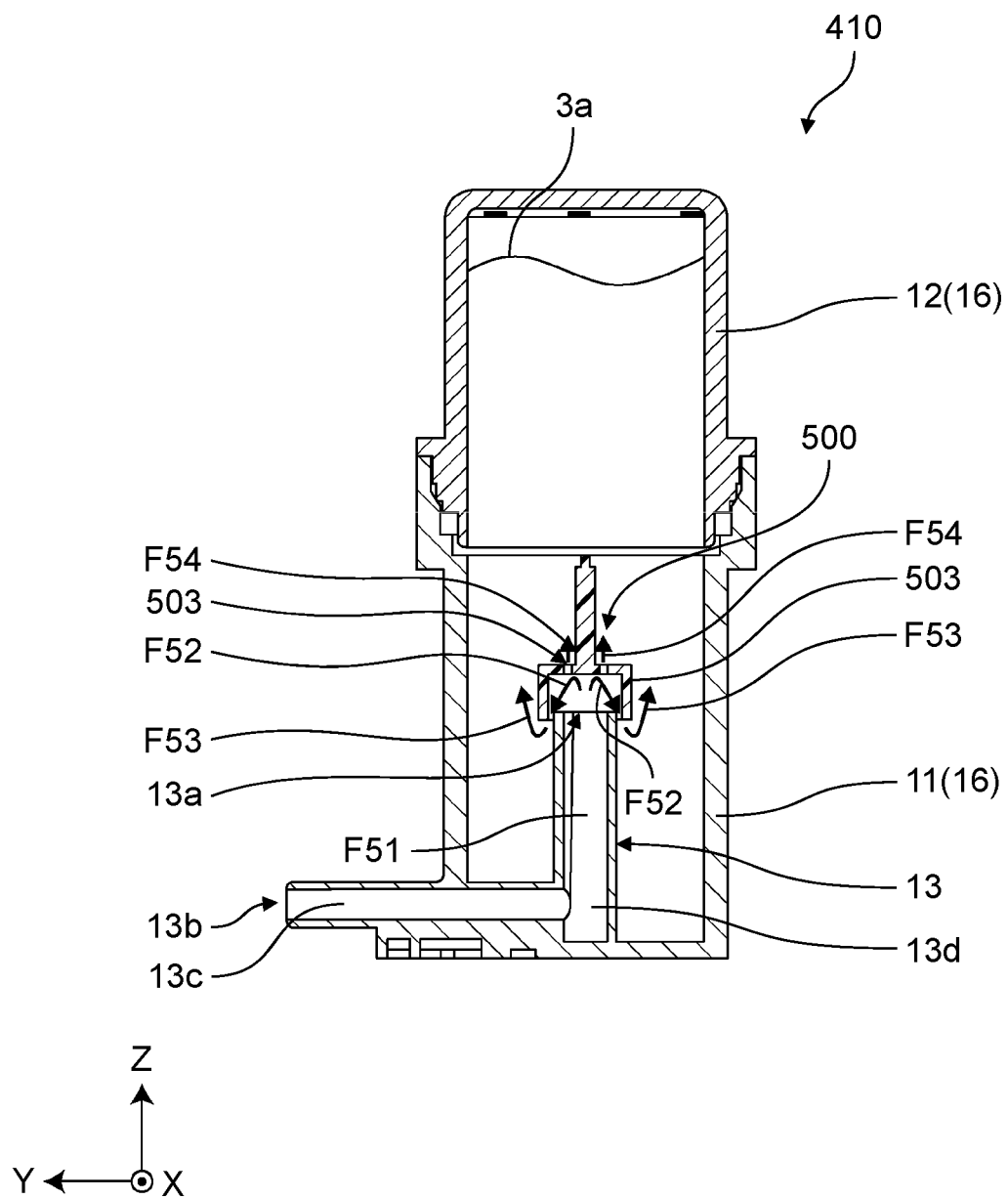
FIG. 17B is a cross-sectional view of the reservoir tank of FIG. 17A taken along line M-M.
Figure 17C:
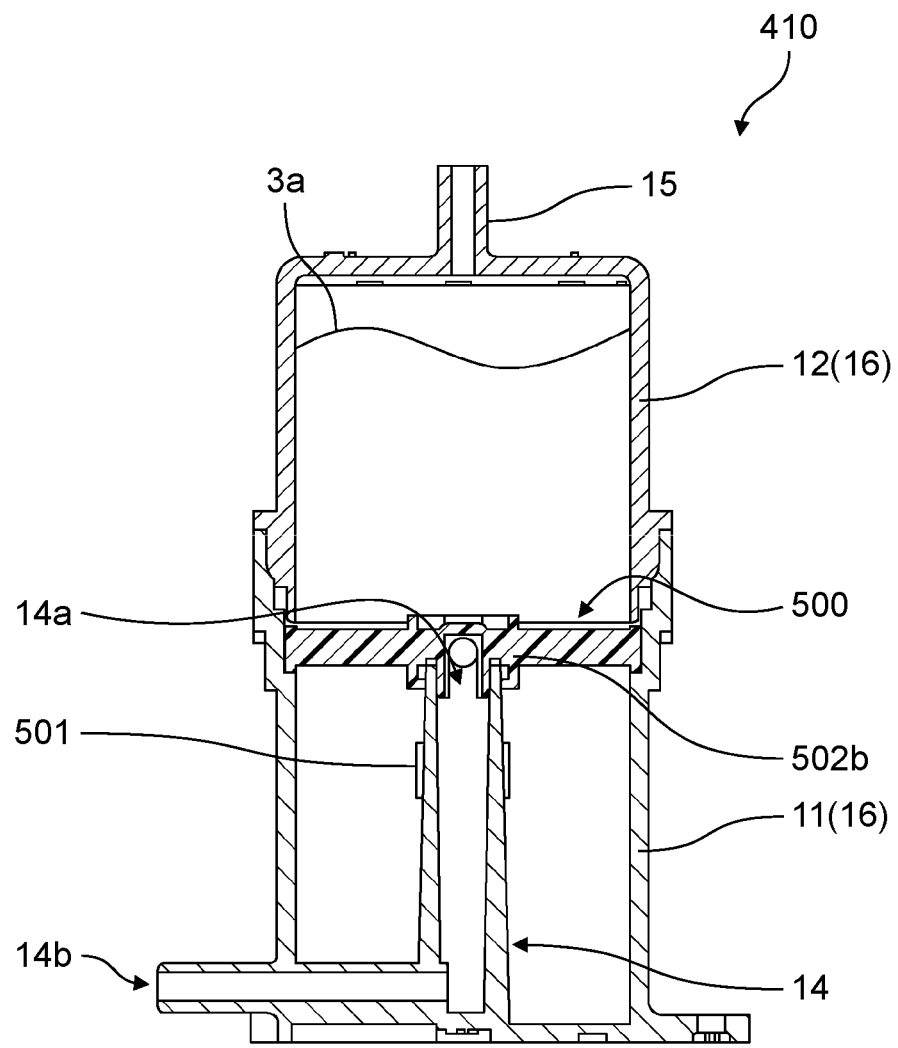
FIG. 17C is a cross-sectional view of the reservoir tank of FIG. 17A taken along line N-N.
Figure 18A:
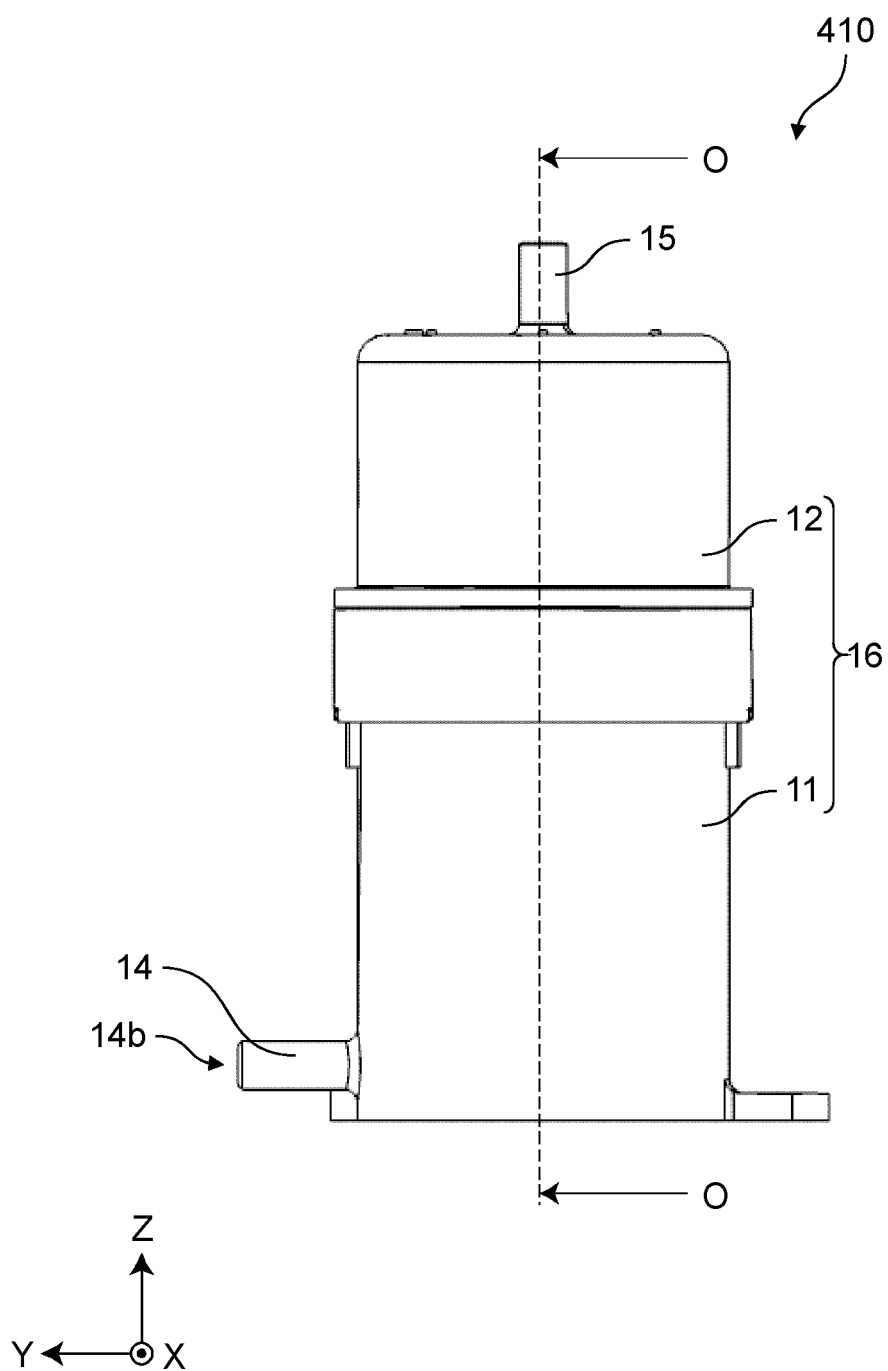
FIG. 18A is a plan view of the reservoir tank of FIG. 17A viewed from another direction.
Figure 18B:
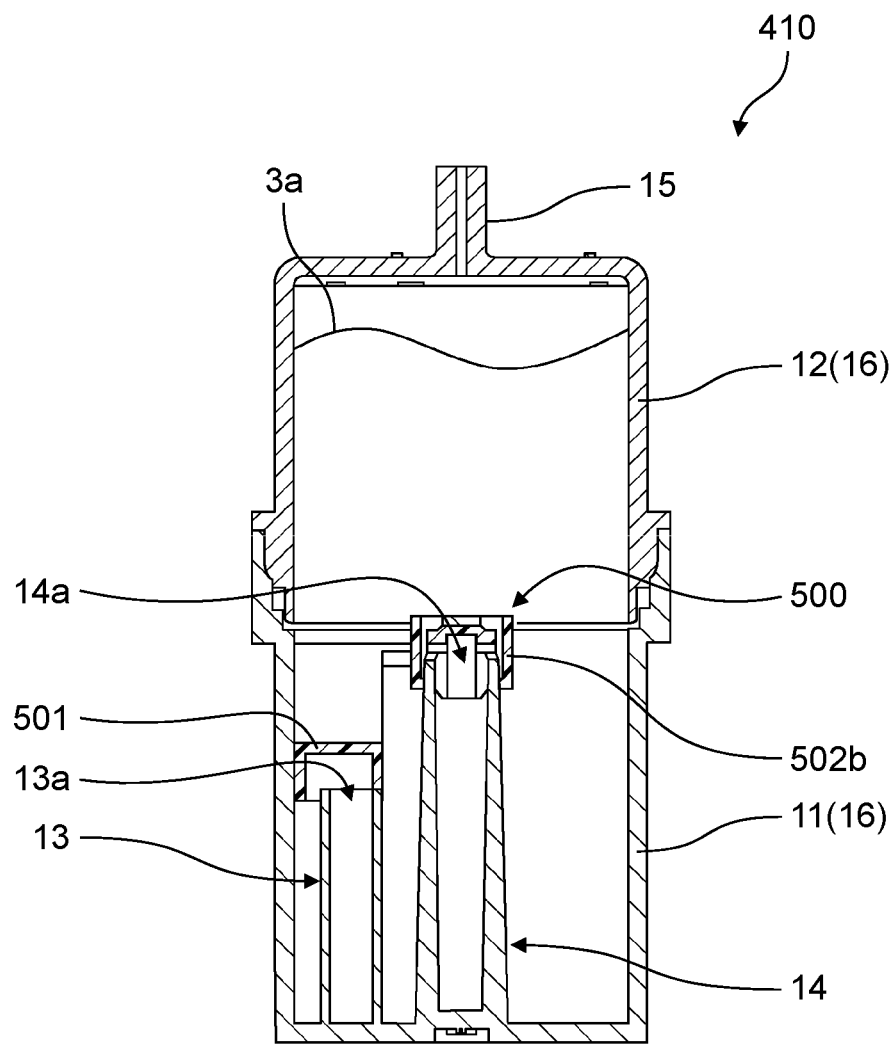
FIG. 18B is a cross-sectional view of the reservoir tank of FIG. 18A taken along line O-O.
Figure 19:
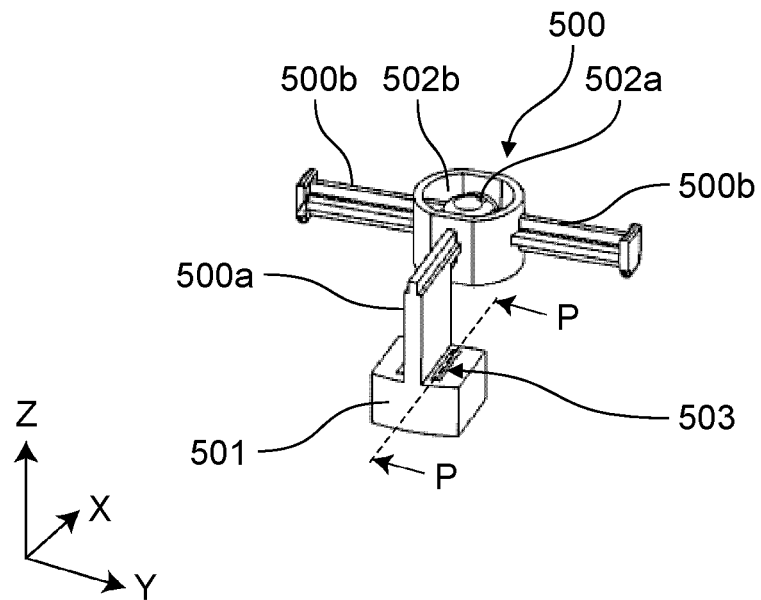
FIG. 19 is a perspective view illustrating an air bubble mixing prevention member and a collision member included in the reservoir tank of FIG. 17A.
Figure 20:
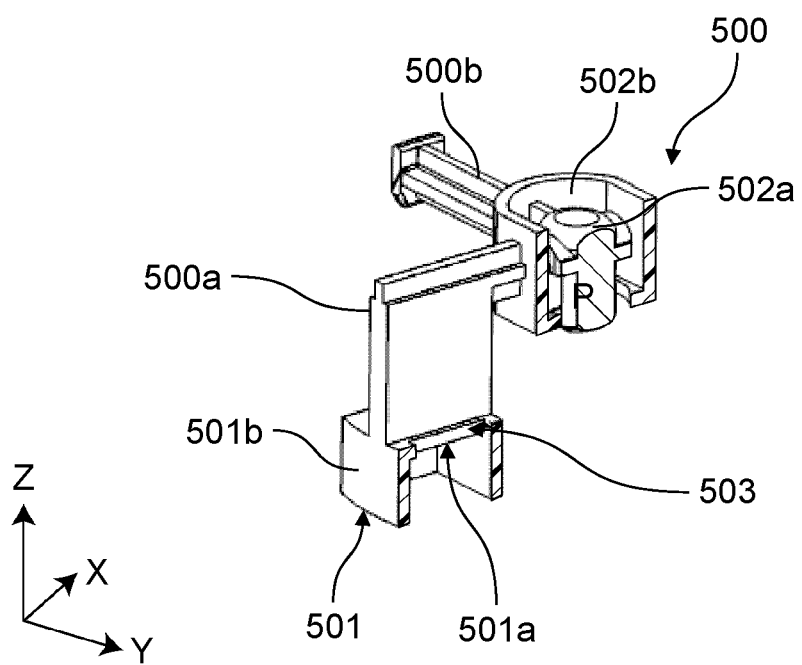
FIG. 20 is a cross-sectional view of the air bubble mixing prevention member and the collision member of FIG. 19 taken along line P-P.

FIG. 17A is a plan view illustrating a reservoir tank 410 according to fifth exemplary embodiment. FIG. 17B is a cross-sectional view of reservoir tank 410 of FIG. 17A taken along line M-M. FIG. 17C is a cross-sectional view of reservoir tank 410 of FIG. 17A taken along line N-N. FIG. 18A is a plan view of reservoir tank 410 of FIG. 17A viewed from another direction. FIG. 18B is a cross-sectional view of reservoir tank 410 of FIG. 18A taken along line O-O. FIG. 19 is a perspective view illustrating air bubble mixing prevention member 500 and collision member 501 included in reservoir tank 410 of FIG. 17A. FIG. 20 is a cross-sectional view of air bubble mixing prevention member 500 and collision member 501 of FIG. 19 taken along line P-P.

The fifth exemplary embodiment is different from the first exemplary embodiment in a shape of collision member 501. As illustrated in FIGS. 17A and 19 to 20, collision member 501 has side wall 501b that surrounds first surface 501a, and side wall 501b covers at least a part of outlet 13a of inflow path 13.

In this case, a part of the refrigerant that flows out from outlet 13a of inflow path 13 into tank main body 16 (arrow F51 in FIG. 17B) collides against first surface 501a of collision member 501, and reverses the traveling direction (arrow F52 in FIG. 17B). The refrigerant that has changed the traveling direction flows along side wall 501b of collision member 501 and flows into tank main body 16 (arrow F53 in FIG. 17B). Further, another part of the refrigerant that flows out from outlet 13a of inflow path 13 into tank main body 16 (arrow F51 in FIG. 17B) passes through through hole 503 provided for collision member 501 and flows into tank main body 16 (arrow F54 in FIG. 17B).

In this manner, by providing collision member 501 in a box shape so as to cover at least a part of outlet 13a of inflow path 13, the traveling direction of a part of the refrigerant that flows out from outlet 13a of inflow path 13 may be reversed. Therefore, the flow velocity of the refrigerant that flows into tank main body 16 may be further reduced. As a result, it is possible to reduce shaking of interface 3a between the refrigerant and air, and to improve gas-liquid separation performance.

In the above description, the exemplary embodiments have been described as examples of the technique in the present disclosure. To this end, the accompanying drawings and detailed description have been provided.

Therefore, the components described in the accompanying drawings and the detailed description may include not only components essential for solving the problem but also components that are non-essential for solving the problem, in order to illustrate the above-described technology. Therefore, it should not be recognized that these non-essential components are essential immediately based on the fact that these non-essential components are described in the accompanying drawings and the detailed description.

In addition, the above-described exemplary embodiments are intended to illustrate the technique in the present disclosure, and therefore various changes, replacements, additions, omissions, and the like may be made within the scope of the claims and equivalents thereof.

The present disclosure is applicable to a reservoir tank, and a cooling device and a projector including the reservoir tank.

What is claimed is:

1. A reservoir tank comprising:
  a tank main body configured to store a refrigerant within the tank main body;
  an inflow path configured to allow the refrigerant to flow into the tank main body;
  an outflow path configured to allow the refrigerant to flow out of the tank main body; and
  an air bubble mixing prevention member that faces an inlet of the outflow path within the tank main body, wherein
  the air bubble mixing prevention member is configured to prevent air bubbles from getting into the outflow path,
  the inflow path includes a first inflow path into which the refrigerant flows from outside the tank main body, and a second inflow path connected to an outlet of the inflow path from the first inflow path,
  the second inflow path has a cross-sectional area larger than a cross-sectional area of the first inflow path, and
  the air bubble mixing prevention member includes:
    a lid portion facing the inlet of the outflow path; and
    a wall surrounding both of the inlet of the outflow path and the lid portion.

2. The reservoir tank according to claim 1, further comprising:
  a collision member that has a first surface and faces the outlet of the inflow path within the tank main body, wherein the collision member is configured such that the refrigerant flowing out from the outlet of the inflow path collides against the first surface of the collision member.

3. The reservoir tank according to claim 1, wherein the inlet of the outflow path is disposed within the tank main body at a position away from an inner wall of the tank main body.

4. The reservoir tank according to claim 1, wherein the inflow path is configured such that a direction in which the refrigerant flows through the first inflow path is orthogonal to a direction in which the refrigerant flows through the second inflow path.

5. The reservoir tank according to claim 2, wherein
  the outlet of the inflow path and the inlet of the outflow path are disposed in a first direction,
  the outlet of the inflow path is provided at a position different from a position of the inlet of the outflow path in the first direction, and
  the collision member is disposed between the outlet of the inflow path and the inlet of the outflow path in the first direction.

6. The reservoir tank according to claim 2, wherein
  the collision member has a second surface opposite to the first surface, and
  the collision member has one or more through holes through which the refrigerant moves from the first surface toward the second surface.

7. The reservoir tank according to claim 2, wherein the collision member and the air bubble mixing prevention member are provided integrally.

8. The reservoir tank according to claim 2, wherein the first surface of the collision member is provided in a planar shape.

9. A cooling device comprising:
  the reservoir tank according to claim 1;
  a pump configured to circulate the refrigerant;
  a heat sink configured to receive heat from a heat source; and
  a heat exchanger configured to cool the refrigerant,
  wherein the heating element is cooled by circulation of the refrigerant stored in the reservoir tank.

10. A projector comprising the cooling device according to claim 9.

\* \* \* \* \*